(12) United States Patent
Sekiguchi

(10) Patent No.: US 6,556,515 B1
(45) Date of Patent: Apr. 29, 2003

(54) WATCH WITH LIQUID CRYSTAL DISPLAY PANEL

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/926,204

(22) PCT Filed: Nov. 11, 1999

(86) PCT No.: PCT/JP99/06302
§ 371 (c)(1),
(2), (4) Date: Sep. 24, 2001

(87) PCT Pub. No.: WO00/58796
PCT Pub. Date: Oct. 5, 2000

(30) Foreign Application Priority Data

Mar. 25, 1999 (JP) ............................................ 11-081472

(51) Int. Cl.⁷ .......................... G04C 17/00; G09G 3/18; G02F 1/1333; G02F 1/1343
(52) U.S. Cl. ........................... 368/242; 345/50; 345/53; 349/138; 349/142
(58) Field of Search .......................... 368/82, 84, 239, 368/242; 345/50, 53, 88; 349/138–142

(56) References Cited

U.S. PATENT DOCUMENTS

| 4,277,786 A | | 7/1981 | Waldron |
| 4,429,955 A | * | 2/1984 | Portmann .................... 350/332 |
| 5,155,476 A | * | 10/1992 | Shioji ........................ 340/784 |
| 5,537,236 A | * | 7/1996 | Young .......................... 359/87 |

FOREIGN PATENT DOCUMENTS

| JP | 53-48772 | 5/1978 |
| JP | 54-35677 | 3/1979 |
| JP | 54-83863 | 7/1979 |
| JP | 56-39584 | 4/1981 |
| JP | 57-185993 | 11/1982 |
| JP | 62-11884 | 1/1987 |

* cited by examiner

Primary Examiner—Vit Miska
(74) Attorney, Agent, or Firm—Armstrong, Westerman & Hattori, LLP

(57) ABSTRACT

A liquid crystal display panel (10) in a watchcase (41) displays time information and/or calendar information. In the liquid crystal display panel (10), a liquid crystal layer (3) is disposed between an upper substrate (1) and a lower substrate (2). On the upper substrate (1) are formed segment electrodes (5g) and an auxiliary electrode (11) that surrounds the segment electrodes with gaps (G1), and the segment and auxiliary electrodes are composed of the same transparent conductive film. An opposite electrode (6) is formed over the entire display area of the lower substrate (2). The overlaps between the opposite electrode (6) and the segment electrodes (5g) form pixel areas (32), while the overlap between the opposite electrode (6) and the auxiliary electrode (11) forms a background area (33). Voltage is selectively applied to the liquid crystal layer (3) in the pixel areas (32) and the background area (33) respectively to change the state of the transmission, scattering or absorption of the light incident on the liquid crystal layer (3) as desired, so that time information and calendar information are displayed.

20 Claims, 23 Drawing Sheets

F I G. 1 4
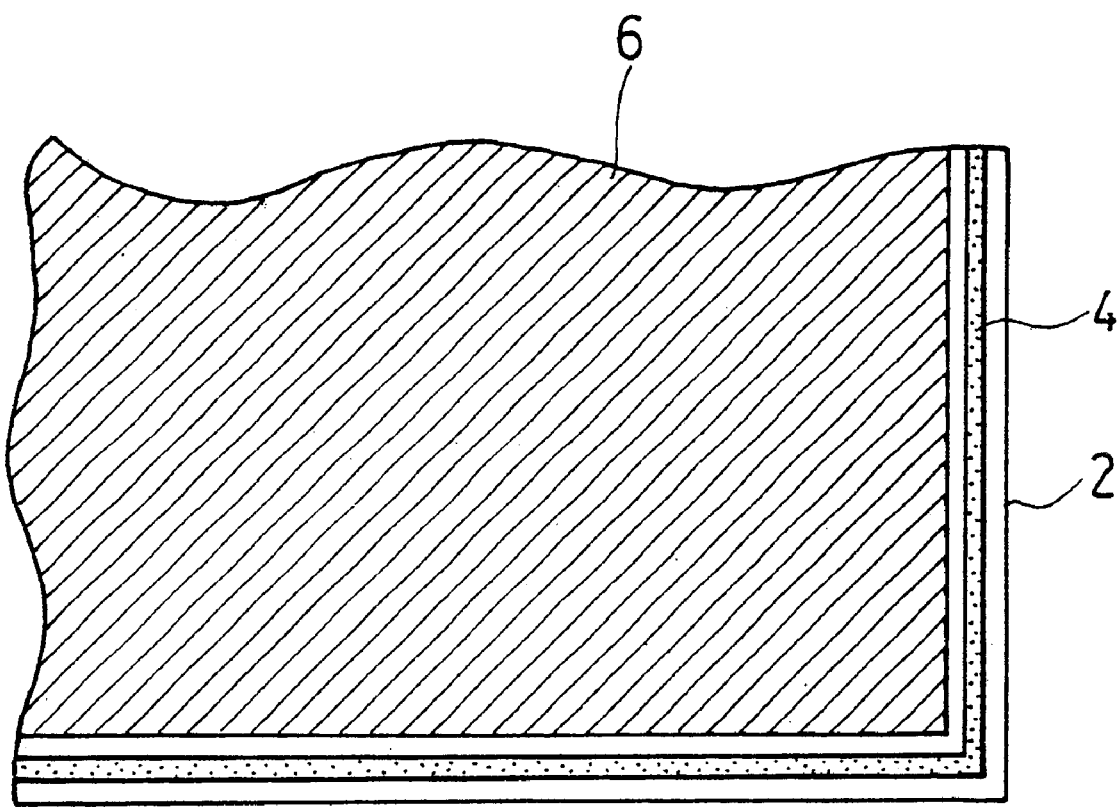

F I G. 1 7
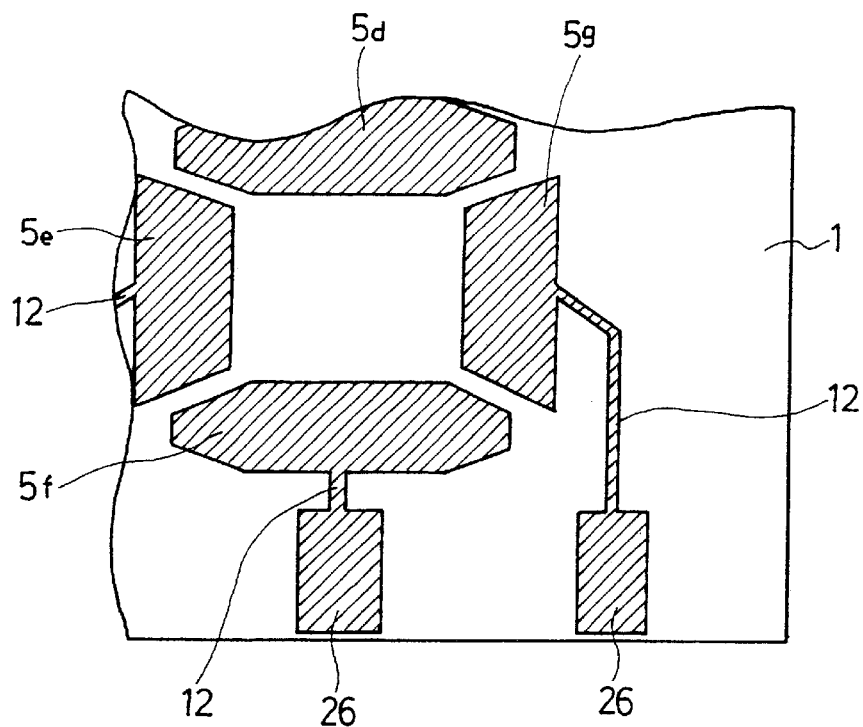
F I G. 1 8
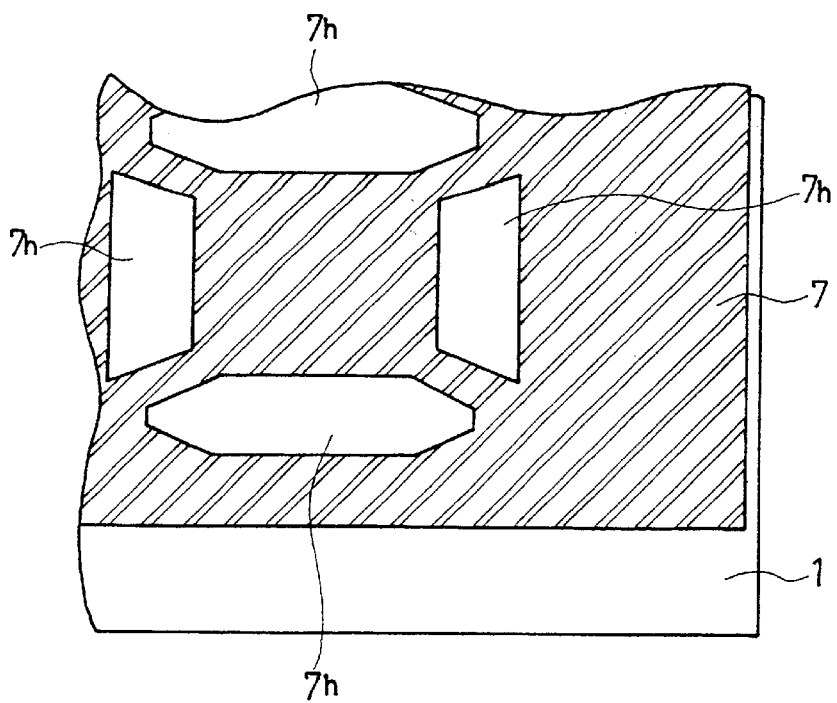

F I G. 2 6
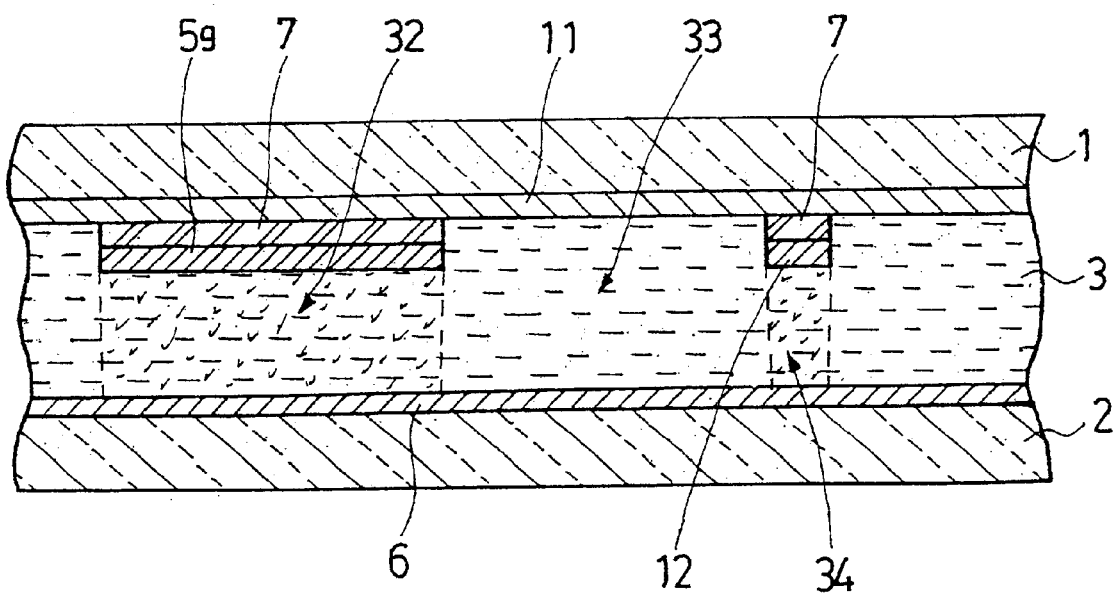

WATCH WITH LIQUID CRYSTAL DISPLAY PANEL

TECHNICAL FIELD

The present invention relates to a timepiece (electronic timepiece) with a liquid crystal display panel for displaying either time information or calendar information or both. This timepiece includes a digital display type wristwatch, table clock and wall clock each for displaying by characters or numerals only time, or a year, a month, a date, and days of the week (calendar information) in addition to time, various combination types of timepieces each for performing analog display of time by hands and digital display of calendar information, and a calendar timepiece for performing digital display of only calendar information, and the like.

BACKGROUND TECHNOLOGY

There are display methods in an electronic timepiece: a digital display mode of displaying time information and/or calendar information by characters or numerals using a liquid crystal display panel; and an analog display mode of displaying time by rotating hands (second hand, minute hand, hour hand) by a stepping motor.

Further, there are segment-type and matrix-type liquid crystal display panels for digital display, each for displaying information by characters and numerals. The segment type is positively used as a display portion for time and the like of an electronic timepiece because of ease for use and low manufacturing cost though it has low flexibility of display (display capacity) as compared to the matrix type.

A conventional segment-type liquid crystal display panel is structured such that two glass substrates has a liquid crystal layer sandwiched therebetween, one of the substrates has thereon a plurality of segment electrodes of segment-type electrodes forming a pattern of numeral or the like, and the other substrate has thereon an opposite electrode which is disposed to face the segment electrodes to perform a display by a pattern of combination of the segment electrodes through use of optical change in the liquid crystal layer caused by selectively applying voltage to the liquid crystal layer by means of the segment electrodes and the opposite electrode.

Hence, in such a conventional segment-type liquid crystal display panel, only a portion where the segment electrode and the opposite electrode overlap each other operates as a pixel area (display area), but a display state in the other area (background area) can not be controlled.

Accordingly, specifically in the case in which a mixed liquid crystal layer composed of a liquid crystal and a transparent solid substance is used as the liquid crystal layer, and when the liquid crystal layer has a scattering property where no voltage is applied thereto or when it has a transmission property where no voltage is applied thereto, it is impossible to easily reverse brightness and darkness of the display as in the liquid crystal display panel using a twisted nematic liquid crystal layer or the like and a polarizer.

Similarly, also when a mixed liquid crystal layer composed of a liquid crystal and a dichroic dye is used as the liquid crystal layer, it is impossible to easily reverse a transmission area and a colored area in the liquid crystal layer.

In the case of the liquid crystal display panel using a twisted nematic (TN) liquid crystal layer or a super twisted nematic (STN) liquid crystal layer and a polarizer, brightness and darkness of display can be reversed by an attaching angle of the polarizer but it is impossible to perform a display by optionally controlling brightness and darkness of the display area and the background area.

One example of the conventional segment-type liquid crystal display panel used as a time display portion of a timepiece is now explained with reference to the drawings. FIG. 36 is a plane view showing an enlarged arrangement example of segment electrodes and an opposite electrode in the conventional segment-type liquid crystal display panel, and FIG. 37 is a partially enlarged cross-sectional view of the liquid crystal display panel taken along a line XXXVII—XXXVII in FIG. 36.

In this liquid crystal display panel, as shown in FIG. 37, a first substrate 1 that is a transparent glass substrate disposed at the upper side (visible side) and a second substrate 2 that is a transparent glass substrate disposed at the lower side (the opposite side to the visible side) are coupled together with a predetermined gap intervening therebetween with spacers and a sealing material which are not shown, and a liquid crystal layer 3 is sealed in the gap, which is composed of a mixed liquid crystal of a liquid crystal and a transparent solid substance.

On the first substrate 1 (inner surface), as clearly shown in FIG. 36, a plurality of segment electrodes 5a to 5g (referred to as "segment electrodes 5" when they are collectively called) are provided, which are made of a transparent conductive film. On the other hand, on the second substrate 2 (inner surface), an opposite electrode 6 made of a transparent conductive film is provided to face the entire region including the segment electrodes 5a to 5g.

In this example, seven segment electrodes 5a to 5g take a pattern arrangement of the form of "8", and gaps are provided between the segment electrodes 5a to 5g respectively. This is a so-called seven-segment type arrangement. Further, the segment electrodes 5a to 5g have respective wiring electrodes 12 which are respectively connected to segment electrode terminals (not shown) for individually applying external signals thereto.

Overlaps between the segment electrodes 5a to 5g and the opposite electrode 6 form a pixel area (display area) 32, and the other portion forms a background area 33.

The transparent solid substance in the liquid crystal layer 3 is formed in such a manner that a liquid crystal, in which an organic monomer is dissolved in advance, is injected into the gap between the first substrate 1 and the second substrate 2 and then applied with ultraviolet light.

A display by this liquid crystal display panel is performed utilizing anisotropy of optical refractive index of the mixed liquid crystal forming the liquid crystal layer 3. More specifically, when optical refractive indices of the liquid crystal and the transparent solid substance which constitute the mixed liquid crystal are substantially the same, the display becomes transparent, and as both optical refractive indices become different, its scattering degree increases.

Actually, a predetermined signal (voltage) is selectively applied to the liquid crystal layer 3 by the segment electrodes 5 and the opposite electrode 6 which are in contact with both upper and lower surfaces of the liquid crystal layer 3 respectively to control the optical refractive index of the mixed liquid crystal, thereby performing a desired display.

For example, when numeral "1" is displayed, voltage is applied between the segment electrodes 5c and 5g, and the opposite electrode 6, and not applied between the other segment electrodes 5a, 5b, 5d, 5e and 5f, and the opposite electrode 6, whereby only portions of the pixel area 32 where the liquid crystal layer 3 is sandwiched between the segment electrodes 5c and 5g, and the opposite electrode 6 reduce in scattering degree (increase in transmittance) to have a scattering degree different from that of the other portion of the pixel area 32 and background area 33, thereby enabling recognition of "1".

In such a conventional liquid crystal display panel, however, scattering and transmission of the liquid crystal layer 3 at the pixel area 32 provided with the segment electrodes 5 can be controlled by applying voltage between the segment electrodes 5 and the opposite electrode 6, but they at the background area 33 around the pixel area 32 can not be controlled, allowing the liquid crystal layer 3 at the background area 33 to always maintain the scattering state.

Accordingly, in order to bring the background area 33 into the transmission state, it is necessary to improve the material of the mixed liquid crystal or manufacturing method. It is impossible to easily reverse the brightness and darkness of the display by changing the attaching angle of the polarizer as in the conventional liquid crystal display panel by way of combination of the twisted nematic (TN) liquid crystal layer or the super twisted nematic (STN) liquid crystal layer and the polarizer.

Further, when the above-described mixed liquid crystal layer is used, it is impossible to optionally perform in the same liquid crystal display panel, for example, a display in which the background area 33 is in a scattering state and the pixel area 32 is in a transmission state and a display in which conversely the background area 33 is in a transmission state and the pixel area 32 is in a scattering state.

Furthermore, even when the twisted nematic (TN) liquid crystal layer or the super twisted nematic (STN) liquid crystal layer and the polarizer are used, it is impossible to electrically reverse bright and dark states of the pixel area and the background area when necessary in the same liquid crystal display panel.

This is the same also in a liquid crystal display panel using a mixed liquid crystal layer containing a liquid crystal and a dichroic dye as a liquid crystal layer.

Therefore, it is desired to control the quantity of transmission, scattering or absorption of light at the background area and the pixel area in the liquid crystal display panel for performing a display by change in the quantity of transmission, scattering or absorption of light by the liquid crystal layer without changing material and manufacturing method of the liquid crystal layer.

Moreover, it is difficult in the conventional liquid crystal display panel to allow an observer to recognize information behind the liquid crystal display panel by controlling the quantity of transmission, scattering or absorption of light at the background area, or to dispose a photovoltaic device such as a solar cell behind the liquid crystal display panel and apply required light thereto.

Therefore, the conventional liquid crystal display panel has limits in visual design as a liquid crystal display panel used in a timepiece, not satisfying the desire of a consumer sufficiently.

The present invention is made in view of the above-described technical background, and its object is to make it possible to optionally reverse brightness and darkness of the pixel area and the background area of a liquid crystal display panel for displaying time information and calendar information, to optionally control the quantity of transmission, scattering or absorption of light in the background area, allowing information behind the liquid crystal display panel to be viewed, or to dispose a photovoltaic device therein and optionally control the quantity of its power generation, thereby improving variety of visual design and function of a timepiece.

DISCLOSURE OF THE INVENTION

In order to achieve the above-described object, a liquid crystal display panel for displaying either time information or calendar information or both is structured as follows.

A liquid crystal display panel includes a liquid crystal layer sandwiched between transparent first and second substrates, and a plurality of segment electrodes on the first substrate and an opposite electrode on the second substrate respectively to perform a display by a change in a state of transmission, scattering or absorption of light which is made incident on the liquid crystal layer, caused by selectively applying voltage to the liquid crystal layer by means of the segment electrodes and the opposite electrode, wherein an auxiliary electrode is provided around each segment electrode on the first substrate with a slight gap intervening between the segment electrode and the auxiliary electrode, and the auxiliary electrode is formed of the same transparent conductive film as that of the segment electrodes, and an overlap between the opposite electrode and the segment electrode forms a pixel area, and an overlap between the opposite electrode and the auxiliary electrode forms a background area.

Further, it is preferable to provide a plurality of segment electrode terminals for individually applying external signals to the plurality of segment electrodes, and wiring electrodes for connecting the segment electrode terminals and the segment electrodes respectively, in which the auxiliary electrode is provided with a slight gap intervening also between the auxiliary electrode and the wiring electrode, the auxiliary electrode, the segment electrodes and the wiring electrodes are formed of the same transparent conductive film, and overlaps between the opposite electrode and the wiring electrodes also form the background area.

It is desirable to make the gap between the wiring electrode and the auxiliary electrode on the first substrate smaller than the gap between the segment electrode and the auxiliary electrode.

It is desirable that at least a portion of the wiring electrode with a gap formed between the wiring electrode and the auxiliary electrode is made a thin wire electrode portion having a width that is the same as or smaller than that of the gap.

It is preferable that the wiring electrode outside an outer periphery of the background area is a thick wire electrode portion having a width larger than that of the thin wire electrode portion.

In this case, it is preferable to protrude a portion of an outer peripheral portion of the auxiliary electrode close to the thin wire electrode portion to be close to the thick wire electrode portion of the wiring electrode to form a gap between the protruding portion and the thick wire electrode portion, which is smaller than a gap between the protruding portion and the thin wire electrode portion.

It is desirable that the thick wire electrode portion of the wiring electrode has a connection side portion for connecting the thin wire electrode portion and the segment electrode terminal, and an extending portion extending to the opposite side to the portion, and a gap between the protruding portion of the auxiliary electrode and the extending portion of the wiring electrode is smaller than a gap between the protruding portion of the auxiliary electrode and the connection side portion.

Alternatively, it is also suitable to provide an auxiliary electrode made of a transparent conductive film between each segment electrode and around the segment electrodes on the first substrate to overlap peripheral portions of the segment electrodes, and to electrically insulate the auxiliary electrode from each segment electrode by a transparent insulating film which is provided between the auxiliary electrode and the segment electrode.

In this case, it is preferable to form each segment electrode directly on the first substrate, the insulating film on the first substrate and at least on a peripheral portion of each segment electrode, and the auxiliary electrode on the insulating film.

It is suitable to form the auxiliary electrode and the insulating film in the same planar pattern.

Alternatively, it is also suitable to form the auxiliary electrode directly on the first substrate, the insulating film on the first substrate within opening portions in the auxiliary electrode and at least on peripheral portions of the opening portions in the auxiliary electrode, and the segment electrodes on the insulating film.

In this case, it is suitable to form the segment electrode and the insulating film in the same planar pattern.

Alternatively, it is also suitable to provide an auxiliary electrode made of a transparent conductive film over the entire region forming pixel areas and a background area on the first substrate, a transparent insulating film on the auxiliary electrode, and each segment electrode on the insulating film, thus an overlap between the opposite electrode and the segment electrode forms the pixel area, and an overlap between the opposite electrode and a portion of the auxiliary electrode without the segment electrodes forms the background area.

In this case, the insulating film on the auxiliary electrode may be removed at portions where the segment electrodes are not provided.

Furthermore, it is also possible to provide a plurality of segment electrode terminals for individually applying external signals to the plurality of segment electrodes, and wiring electrodes for connecting the segment electrode terminals and the segment electrodes respectively on the first substrate, and to extend one end portion of each wiring electrode to a segment electrode forming region, wherein a transparent insulating film is provided on the first substrate and each wiring electrode, and the insulating film has an opening portion on the one end portion of each wiring electrode, and each segment electrode and the auxiliary electrode are provided on the insulating film, and each segment electrode and each wiring electrode are connected through the opening portion of the insulating film.

A photovoltaic device may be disposed outside the second substrate of the liquid crystal display panel. Furthermore, a plurality of holes may be formed in the wiring electrode.

When the segment electrodes and wiring electrodes are formed of a metal plate, sufficient electrical conduction can be obtained even if the wiring electrodes are formed extremely thin to be negligible. However, in this case, the first substrate formed thereon with the segment electrodes is disposed on the opposite side to the visible side.

The auxiliary electrode or the opposite electrode may be formed split into a plurality of parts. When the opposite electrode is formed split into a plurality of parts, gaps between the split opposite electrodes and gaps between the plurality of segment electrodes are preferably provided at different positions in a plane view.

It is possible that two above described liquid crystal display panels are tiered to display time information and/or calendar information by the pixel areas and the background areas of the two liquid crystal display panels.

In the timepiece with a liquid crystal display panel according to the invention, since the auxiliary electrode is arranged around the segment electrodes of the liquid crystal display panel for displaying time information and calendar information, and the opposite electrode is disposed on the region facing the auxiliary electrode to constitute the background area as described above, it is possible to apply voltage even to the background area where the opposite electrode and the auxiliary electrode face each other through the liquid crystal layer as in the pixel area where the segment electrode and the opposite electrode face each other even through the same liquid crystal layer as the conventional one is used, thereby changing the display at the background area in the same manner as that at the pixel area.

Further, the auxiliary electrode is formed of the same transparent conductive film as that of the segment electrode with a predetermined gap provided between the auxiliary electrode and each segment electrode, whereby the auxiliary electrode can be formed using the conventional segment electrode pattern forming step, which makes it possible to obtain the segment-type liquid crystal display panel capable of various types of displays with little burden on the step.

This enables a display in which brightness and darkness of the pixel area and the background area reversed, an entirely uniform display, and a display in which contrast is controlled, thereby enabling visually excellent displays of time and calendar of a timepiece.

The time information in the present invention is used as a generic term including not only an hour, a minute and a second but also information of a timer or a chronograph. Further, the calendar information includes a year, a month, a date, days of the week and the like.

Further, the width of the wiring electrode which is connected to each segment electrode to apply a predetermined voltage from an external circuit to each segment electrode is made small, thereby decreasing an optical change in the liquid crystal layer between the wiring electrode and the opposite electrode which influences the display at the background area.

Hence, for example, the segment electrode gap between the segment electrode and the auxiliary electrode and the wiring gap between the wiring electrode and the auxiliary electrode are made 30 $\lambda$m or smaller, thereby allowing the background area to perform a display with receiving little influence of the wiring electrode.

Further, the provision of the insulating film between the segment electrode and the auxiliary electrode and between the wiring electrode and the auxiliary electrode makes it possible to overlap the segment electrode and the auxiliary electrode, or the wiring electrode and the auxiliary electrode, thereby further decreasing influence of the wiring electrode on the background area.

The insulating film is provided on the segment electrodes and the surroundings and the wiring electrodes, and the auxiliary electrode are provided on the insulating film, thereby eliminating influence of the wiring electrodes and further eliminating the segment electrodes gap between the background area and the pixel area to achieve an excellent display quality of time and the like.

Further, the wiring electrodes are provided on the upper substrate, the segment electrodes are provided through the insulating film, each wiring electrode and each segment electrode are electrically connected to each other through the opening portion which is provided at a part of the insulating film, each segment electrode is electrically isolated, and further the auxiliary electrode is provided around the segment electrode with a predetermined gap intervening therebetween, thereby making it possible to perform a substantially entirely uniform display even in the case of a complex wiring electrode.

Furthermore, the auxiliary electrode which is provided around the segment electrodes is split into a plurality of parts, thereby making it possible to conduct a control splitting the display state at the background area into a plurality of parts by controlling voltage between the opposite electrode and each of the split auxiliary electrodes.

Further, a shielding layer or a printing layer is provided between the auxiliary electrodes split in a plurality of parts, thereby improving visibility of a display of each auxiliary electrode. This improves the visibility of a time display and a calendar display. Furthermore, it becomes possible to perform a display in a different color in each split background area to perform a fresh display of time and the like.

Further, in the segment-type liquid crystal display panel having segment electrodes, a plurality of which are connected to each other, and opposite electrodes separated corresponding to the connected segment electrodes, additional opposite electrodes are provided with slight gaps between the additional electrodes and the split opposite electrodes, and signals are applied to the additional opposite electrodes and the auxiliary electrodes, thereby achieving an entirely uniform display.

BRIEF DESCRIPTION OF DRAWINGS

FIG. 14 is a plane view showing a part on the lower substrate side of the liquid crystal display panel of the same;

FIG. 17 is a rear view similar to FIG. 15, showing a pattern of only the segment electrodes formed on the upper substrate of the same;

FIG. 18 is a rear view similar to FIG. 17, showing a pattern of only the insulating film formed on the upper substrate of the same;

FIG. 26 is a partially enlarged cross-sectional view similar to FIG. 23, of a sixth example of the liquid crystal display panel used in the timepiece according to the present invention;

BEST MODE FOR CARRYING OUT THE INVENTION

In order to describe the present invention in more detail, the preferred embodiments of the invention are explained with reference to the accompanying drawings.

First Embodiment: FIGS. 1 to 6

Initially, the first embodiment of a timepiece with a liquid crystal display panel according to the invention is explained with FIG. 1 to FIG. 6.

Figure 1:
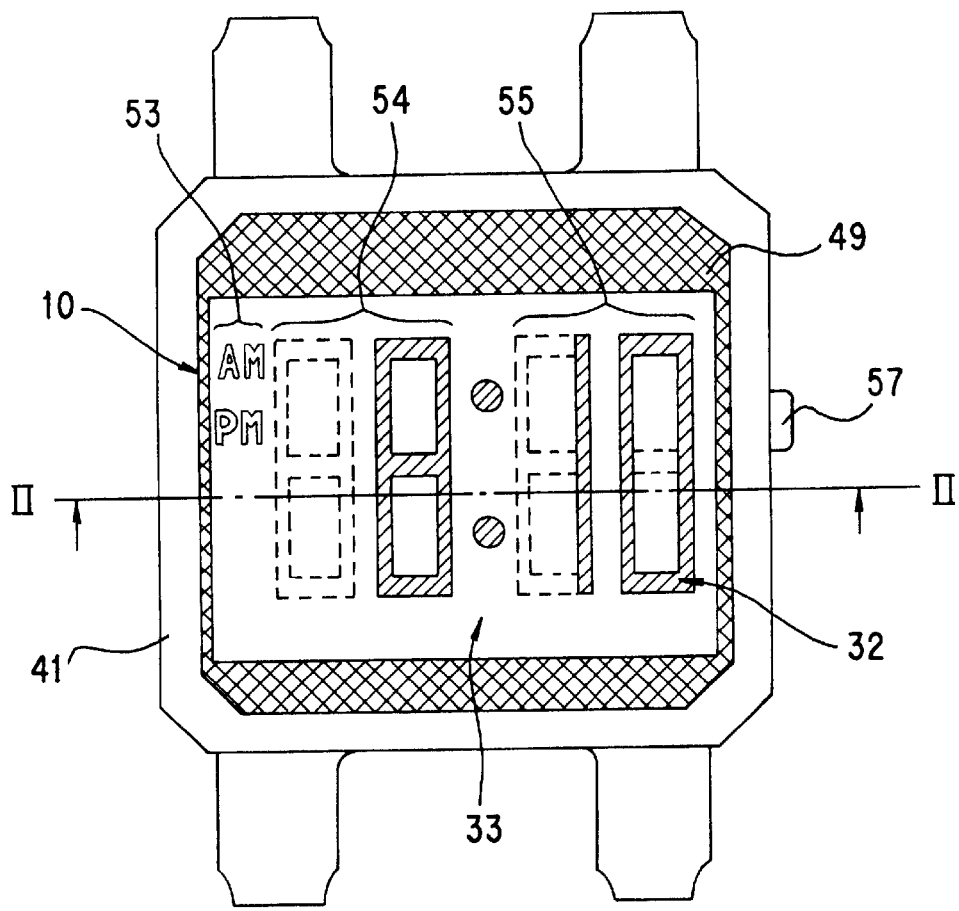
FIG. 1 is a plane view showing a first embodiment of a timepiece with a liquid crystal display panel according to the present invention.
Figure 2:
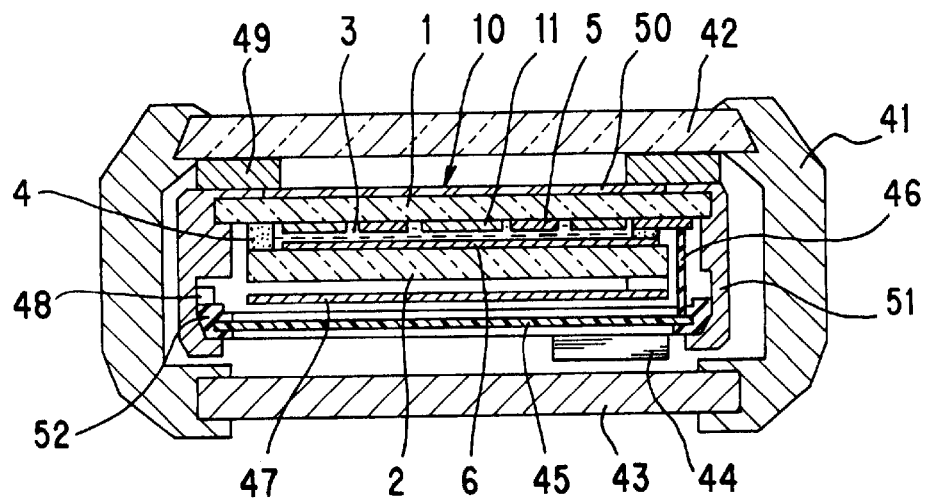
FIG. 2 is a schematic cross-sectional view taken along a line II—II in FIG. 1.

First, the external appearance and the internal structure of the timepiece are explained with FIG. 1 and FIG. 2. FIG. 1 is a plane view showing the external appearance of the first embodiment of the timepiece with a liquid crystal display panel according to the invention, and FIG. 2 is a schematic cross-sectional view taken along a line II—II in FIG. 1.

This timepiece is an electronic wristwatch in a digital display mode, in which a watchcase 41 made of metal, a cover glass 42 and a case back 43 are fitted with each other to form a sealed space as shown in FIG. 2. At a position close to the cover glass 42 in the space, a liquid crystal display panel 10 for displaying time is disposed.

Under the liquid crystal display panel 10, a reflector 47 is provided with a predetermined gap intervening therebetween, and further a circuit board 45 and a battery 44, which is a power supply for driving circuits and the liquid crystal display panel 10, are arranged.

In the liquid crystal display panel 10, an upper substrate (first substrate) 1 and a lower substrate (second substrate) 2, each of which is made of transparent glass, are coupled together with a sealing material 4, and a liquid crystal layer 3 is disposed in a gap therebetween, which is composed of a mixed liquid crystal composed of a liquid crystal containing a transparent solid substance.

On the inner surface of the upper substrate 1, a plurality of segment electrodes 5 and an auxiliary electrode 11 are provided with a slight gap intervening therebetween, which are made of the same transparent conductive film, and on the inner surface of the lower substrate 2, an opposite electrode 6 is provided over the entire display region, which is also made of a transparent conductive film.

Voltage is selectively applied to the liquid crystal layer 3 through the segment electrodes 5 and the auxiliary electrode 11, and the opposite electrode 6 to change the state of transmission, scattering or absorption of light which is incident on the liquid crystal layer 3, thereby performing a digital display of time and the like. Therefore, overlaps between the opposite electrode 6 and the segment electrodes 5 form pixel areas, and an overlap between the opposite electrode 6 and the auxiliary electrode 11 forms a background area.

The connection between the liquid crystal display panel 10 and the circuit board 45 for driving it is established by a zebra rubber connector 46 which is made by laminating a conductive material and an insulating material, and the zebra rubber connector 46 is connected to each terminal on the upper substrate 1.

The electrical connection to the opposite electrode 6 on the lower electrode 2 is established from an opposite electrode terminal on the upper substrate 1 through conductive beads (not shown) contained in the sealing material 4 to an opposite electrode conducting portion on the lower substrate 2.

Furthermore, between the lower substrate 2 and the reflector 47, a light emitted diode (LED) device 48 is provided which is turned on when external light that is a main light source is dim. This LED device 48 functions as an auxiliary light source.

Since the liquid crystal layer 3 used in this embodiment has a scattering property, part of light emitted by the LED device is made incident on the liquid crystal layer 3 and scatters, another part thereof is reflected by the reflector 47 and then made incident on the liquid crystal layer 3 to repeat scattering and reflection, presenting illumination similar to an uniform surface light source.

Moreover, a panel cover 49 for shielding the sealing material 4 is provided above the upper substrate 1. Furthermore, a panel holder 51 is provided to hold the liquid crystal display panel 10 and the zebra rubber connector 46, and a substrate holder 52 is provided to hold the LED device 48, the circuit board 45 and the battery 44.

Further, on the upper substrate 1, an ultraviolet cut film 50, which has been subjected to anti-reflection treatment, is provided to prevent application of ultraviolet light to the liquid crystal layer 3 and deterioration in color due to application of ultraviolet light to the reflector 47 and to allow external light to be made incident efficiently on the reflector 47.

Meanwhile, an adjusting button 57 is provided outside the watchcase 41, as shown in FIG. 1, which is used for adjusting time, changing display contents, stopping buzzer, and the like.

A user can view from outside pixel areas 32 and a background area 33 which constitute a display region within the panel cover 49 of the liquid crystal display panel which is provided under the cover glass 42. The pixel areas 32 are composed of a morning/afternoon display area 53, an hour display area 54, and a minute display area 55 depending on their display contents. Further, it is preferred to provide independently a calendar display area, a stopwatch display area, a chronograph display area and the like, or to allow the hour display area 54 and the minute display area 55 to also serve as these display areas.

The liquid crystal display panel 10 used in this watch is explained hereinafter in more detail using FIG. 3 to FIG. 5.

Figure 3:
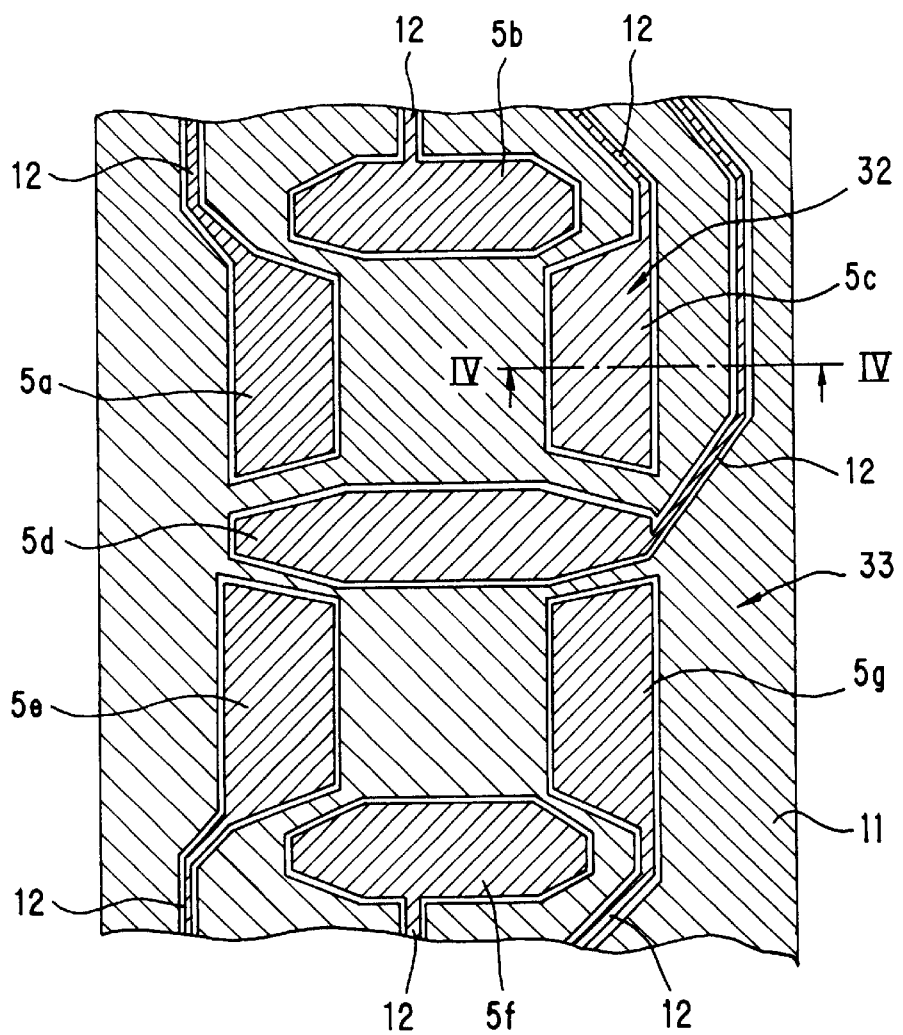
FIG. 3 is a plane view showing an enlarged arrangement example of segment electrodes and an auxiliary electrode in the liquid crystal display panel used in the timepiece according to the present invention.
Figure 4:
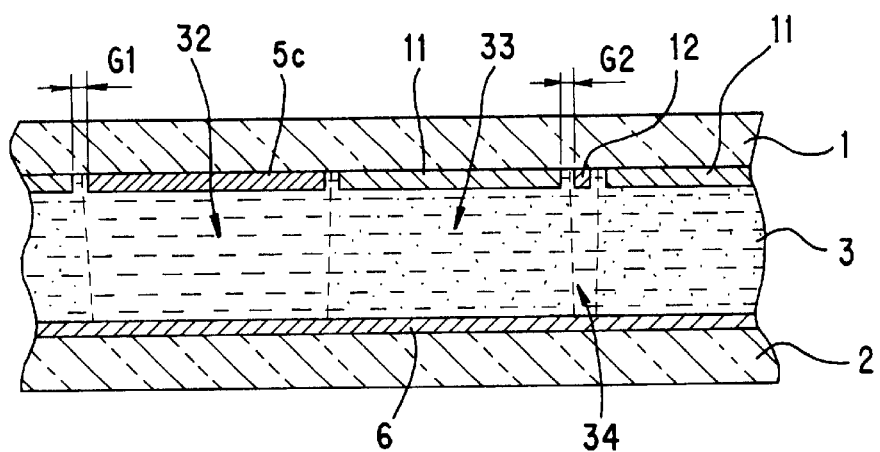
FIG. 4 is a partially enlarged cross-sectional view corresponding to a cross section taken along a line IV—IV in FIG. 3 of the liquid crystal display panel of the same.
Figure 5:
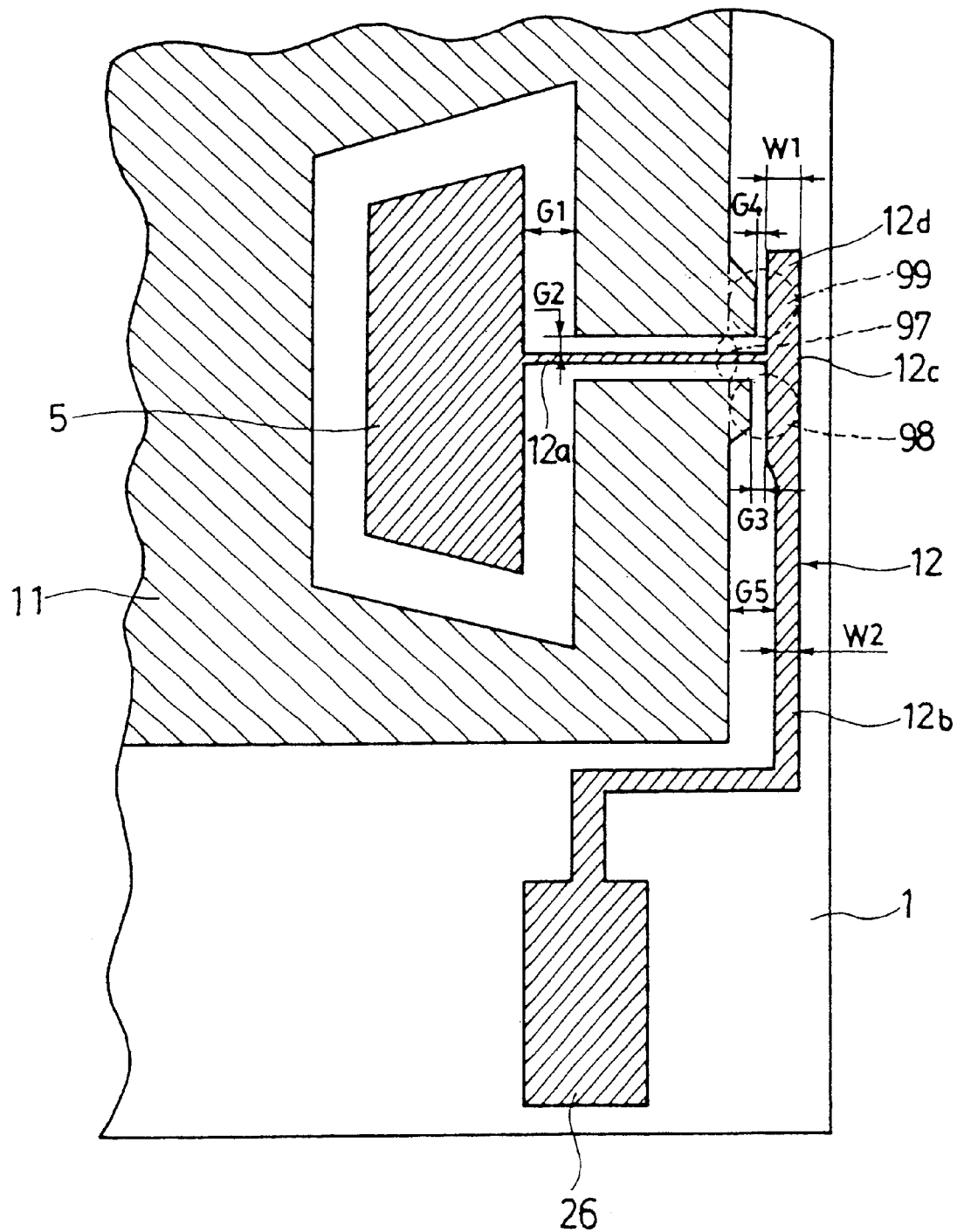
FIG. 5 is an enlarged plane view of an essential portion showing the relationship between the segment electrode, the auxiliary electrode, a wiring electrode and a segment electrode terminal which are formed on an upper substrate of the same.

FIG. 3 is a plane view showing an enlarged arrangement example of the segment electrodes and the auxiliary electrode in the liquid crystal display panel, FIG. 4 is a partially enlarged cross sectional view corresponding to a cross section taken along a line IV—IV in FIG. 3 of the liquid crystal display panel, and FIG. 5 is an enlarged cross-sectional view of an essential portion showing the relationship between the segment electrode, the auxiliary electrode, a wiring electrode, and a segment electrode terminal which are formed on the upper substrate.

In the liquid crystal display panel, as clearly shown in FIG. 4, the upper substrate (first substrate) 1 and the lower substrate (second substrate) 2, each of which is a transparent glass substrate, are arranged opposed with a predetermined gap intervening therebetween, and the liquid crystal layer 3 is disposed in the gap.

On the inner surface of the upper substrate 1, a plurality of segment electrodes 5a to 5g (referred to as "5" when they are collectively called) each of which is made of an indium tin oxide (ITO) film that is a transparent conductive film are formed in a pattern split into seven segments in the form of "8" as shown in FIG. 3. Between the segment electrodes 5a to 5g, predetermined gaps are provided respectively.

The segment electrodes 5a to 5g are integrally formed with wiring electrodes 12 respectively made of the same transparent conductive film to be connected respectively to the segment electrode terminals which are formed at the peripheral portion not shown of the upper substrate 1 in order to apply external signals individually to the segment electrodes 5a to 5g. Each wiring electrode 12 is formed thin to be inconspicuous by making its width small as compared to that of each segment electrode 5.

Furthermore, on the inner surface of the upper substrate 1, the auxiliary electrode 11 which is made of the same transparent conductive film as that of the segment electrode 5 is planarly formed around each segment electrode 5. A slight gap is provided between the auxiliary electrode 11, and each of the segment electrodes 5a to 5g and each wiring electrode 12.

On the inner surface of the lower substrate 2 which is opposed to the upper substrate 1 with a predetermined gap intervening therebetween, the opposite electrode 6 which is also made of an indium tin oxide (ITO) film that is a transparent conductive film is provided to overlap all of the segment electrodes 5a to 5g, the wiring electrodes 12, and the auxiliary electrode 11.

The upper substrate 1 and the lower substrate 2 are coupled together with spacers not shown and the sealing material with the predetermined gap provided therebetween, and the liquid crystal layer 3 is sealed in the gap, which is composed of a mixed liquid crystal containing a liquid crystal and a transparent solid substance.

In this first embodiment, a mixed liquid crystal of PNM-157 (trade name) manufactured by Dainippon Ink and Chemicals, Inc. is used as a row material for the liquid crystal layer 3. The mixed liquid crystal is sealed between the upper substrate 1 and the lower substrate 2, and is then applied with ultraviolet light with a wavelength of 360 nanometers (nm) or longer for 60 seconds at a strength of 45 mW/cm². The liquid crystal layer 3 exhibits a scattering property where no voltage is applied thereto.

In this liquid crystal display panel, the overlaps between the opposite electrode 6 and the segment electrodes 5 form the pixel areas 32, and the overlap between the opposite electrode 6 and the auxiliary electrode 11 forms the background area 33.

FIG. 4 shows a state in which voltage is applied between the segment electrodes 5 and the opposite electrode 6, and no voltage is applied between the auxiliary electrode 11 and the opposite electrode 6.

The voltage is applied to the liquid crystal layer 3 between the segment electrode 5c and the opposite electrode 6 to reduce the scattering degree of the pixel area 32 there, bringing it into a transparent state. Similarly, the voltage is applied to the liquid crystal layer 3 between the wiring electrode 12 and the opposite electrode 6, also bringing a wiring area 34 into a transparent state.

Meanwhile, no voltage is applied to the liquid crystal layer 3 between the auxiliary electrode 11 and the opposite electrode 6, allowing the background area 33 to be in a scattering state. Further, no voltage is applied to portions at a segment electrode gap G1 around the segment electrode 5 and at a wiring gap G2 on either side of the wiring electrode 12, allowing them to be in a scattering state.

In the first embodiment, the wiring electrode 12 is made thin to be 20 μm, thereby making it hard to view the wiring area 34 which is brought into a transparent state by applying voltage to the liquid crystal layer 3 by the wiring electrode 12 and the opposite electrode 6 where no voltage is applied between the auxiliary electrode 11 and the opposite electrode 6 to bring the background area 33 into a scattering state.

Accordingly, control is conducted such that voltage is not applied to the liquid crystal layer 3 between the auxiliary electrode 11 and the opposite electrode 6 to bring the background area 33 into a scattering state but applied to the liquid crystal layer 3 between electrodes for performing a display out of the segment electrodes 5a to 5g and the opposite electrode 6 in accordance with display data, thereby making it possible to display against the background area 33 in the scattering state a numeral by the pixel area 32 in the transparent state corresponding to the segment electrodes 5 to which the voltage is applied as in the conventional liquid crystal display panel.

A film of a dark color such as black or the like is disposed on the rear face side of the liquid crystal display panel, thereby displaying a numeral in a dark color such as black or the like against a whitish background, and a film of an optional color such as red, blue, green or the like is disposed, thereby displaying time or the like in an optional color.

Conversely, voltage is not applied between the segment electrodes 5 which are required to perform a display and the opposite electrode 6 but applied between the segment electrodes 5 which do not perform a display and the auxiliary electrode 11, and the opposite electrode 6, thereby performing a display in which brightness and darkness of the background area and the pixel areas are reversed to the aforementioned case.

In this case, no voltage is applied to the liquid crystal layer 3 between the segment electrode 5c and the opposite electrode 6, allowing the pixel area 32 to be in a scattering state. Similarly, no voltage is applied to the liquid crystal layer 3 between the wiring electrode 12 and the opposite electrode 6, allowing the wiring area 34 to be also in a scattering state. Furthermore, no voltage is applied to portions at the segment electrode gap G1 around the segment electrode 5 and at the wiring gap G2 on either side of the wiring electrode 12, allowing them to be in a scattering state.

Meanwhile, voltage is applied to the liquid crystal layer 3 between the auxiliary electrode 11 and the opposite electrode 6 to reduce the scattering degree of the background area 33, bringing it into a transparent state.

In the first embodiment, the segment electrode gap G1 and the wiring gap G2 are made small to be 3 μm, and the wiring electrode 12 is made thin to be 20 μm, thereby making it hard to recognize the wiring electrode 12 and the gaps G1 and G2 even when the background area 33 is brought into the transparent state by applying voltage between the auxiliary electrode 11 and the opposite electrode 6.

Therefore, control is conducted such that voltage is applied to the liquid crystal layer 3 between the auxiliary electrode 11 and the opposite electrode 6 to bring the background area 33 into a transparent state, and voltage is also applied to the liquid crystal layer 3 between electrodes which do not perform a display out of the segment electrodes 5a to 5g and the opposite electrode 6 in accordance with display data, thereby making it possible to display against the background area 33 in the transparent state a numeral by the pixel area 32 in the scattering state corresponding to the segment electrodes 5 to which no voltage is applied, even when the same mixed liquid crystal as that of the conventional case is used for the liquid crystal layer 3.

Consequently, a film of a dark color such as black or the like is disposed on the rear face side of the liquid crystal display panel, thereby displaying a numeral in a color close to white against a background of a dark color such as black or the like, and a film of an optional color such as red, blue, green or the like is disposed, thereby displaying time or the like by a numeral in a color close to white against an optional background color.

As described above, with the liquid crystal display panel according to the invention, it becomes possible to optionally perform a display of time or the like by the pixel area 32 in the transmission state against the background area 33 in the scattering state, and a display of time or the like by the pixel area 32 in the scattering state against the background area 33 in the transmission state by controlling application of voltage through use of the liquid crystal layer 3 composed of the mixed liquid crystal.

Further, because the segment gaps G1 are provided around the segment electrodes 5a to 5g and the wiring gaps G2 around the wiring electrodes 12, the segment electrodes 5a to 5g, the wiring electrodes 12 and the auxiliary electrode 11 can be formed of the same transparent conductive film at the same time, resulting in the same manufacturing steps as those of the conventional case. Moreover, it is possible for the pixel area 32 and the background area 33 to perform a display in a manner to mutually complement, achieving the aforementioned effects.

Referring to FIG. 5, a structural example of details of the segment electrode 5, the wiring electrode 12, a segment electrode terminal 26 connected to the wiring electrode 12 and the auxiliary electrode 11 which are made of a transparent conductive film provided on the upper substrate (first substrate) 1 is explained here.

Between the segment electrode 5 and the auxiliary electrode 11 therearound, the segment electrode gap G1 which is a predetermined gap is provided. To the segment electrode 5, a thin wire electrode portion 12a having a width of 3 μm of the wiring electrode 12 is connected, and the thin wire electrode portion 12a formed with the wiring gap G2 between either side thereof and the auxiliary electrode 11 passes through the auxiliary electrode 11 to be connected to a thick wire electrode portion 12c which is provided by the outer periphery of the background area. The wiring gap G2 is smaller than the segment electrode gap G1.

Furthermore, outside the periphery of the auxiliary electrode 11, an antistatic portion 98 and an antistatic portion 99 which are shown by broken lines in FIG. 5 are provided to prevent break of wiring due to static electricity generated between the thin wire electrode portion 12a of the wiring electrode 12 and the auxiliary electrode 11.

In other words, if an outlet portion of the thin wire electrode portion 12a at the outer peripheral portion of the auxiliary electrode 11 is in linear form, and the gap between the auxiliary electrode 11 and the thick wire electrode portion 12c is greater than the wiring gap G2 between the thin wire electrode portion 12a and the auxiliary electrode 11, an electrostatic breakdown occurring portion 97, which is shown by a broken line in the vicinity of the edge portion of the auxiliary electrode 11, occurs, leading to a break of the thin wire electrode portion 12a.

For this reason, portions of the outer peripheral portion of the auxiliary electrode 11 close to the thin wire electrode portion 12a are made to protrude to be close to the thick wire electrode portion 12c of the wiring electrode 12 as shown in the drawing, forming gaps G3 and G4, which are smaller than the above-described wiring gap G2, between the protruding portion and the thick wire electrode portion 12c. These are the antistatic portion 98 and the antistatic portion 99.

Furthermore, the thick wire electrode portion 12c of the wiring electrode 12 has a connection side portion 12b for connecting the thin wire electrode portion 12a and the segment electrode terminal 26, and an extending portion 12d extending in the opposite side thereto, and the gap G4 between the protruding portion of the auxiliary electrode 11 and the extending portion 12d of the wiring electrode 12 at the antistatic portion 99 is made smaller than the gap G3 between the protruding portion of the auxiliary electrode 11 and the connection side portion 12b of the wiring electrode 12 at the antistatic portion 98.

Further, in order to prevent the wiring electrode 12 from being broken due to electrostatic breakdown, a width W1 of the thick wire electrode portion 12c is made 50 μm. Furthermore, a width W2 of the connection side portion 12b other than the antistatic portion 98 is made 20 μm, and a gap G5 between the connection side portion 12b other than the antistatic portion 98 and the outer peripheral portion of the auxiliary electrode 11 is made 30 μm.

As occurrence of electrostatic discharge at the antistatic portion 98 increases connection resistance between the segment electrode 5 and the segment electrode terminal 26, it is preferable to make the gap G4 between the auxiliary electrode 11 and the extending portion 12d of the wiring electrode 12 at the antistatic portion 99 smaller than the gap G3 between the auxiliary electrode 11 and the thick wire electrode portion 12c of the wiring electrode 12 at the antistatic portion 98.

When the display of the background area by the auxiliary electrode 11 differs from that of the pixel area by the segment electrode 5, the portion of the wiring electrode 12 has an optical characteristic which is also different from that of the background area, allowing the portion of the wiring electrode 12 to be recognized.

Therefore, the wiring electrode 12 is made thin and the wiring gap G2 is made smaller than the segment electrode gap G1 to reduce visibility of the portion of the wiring electrode 12.

Figure 6:
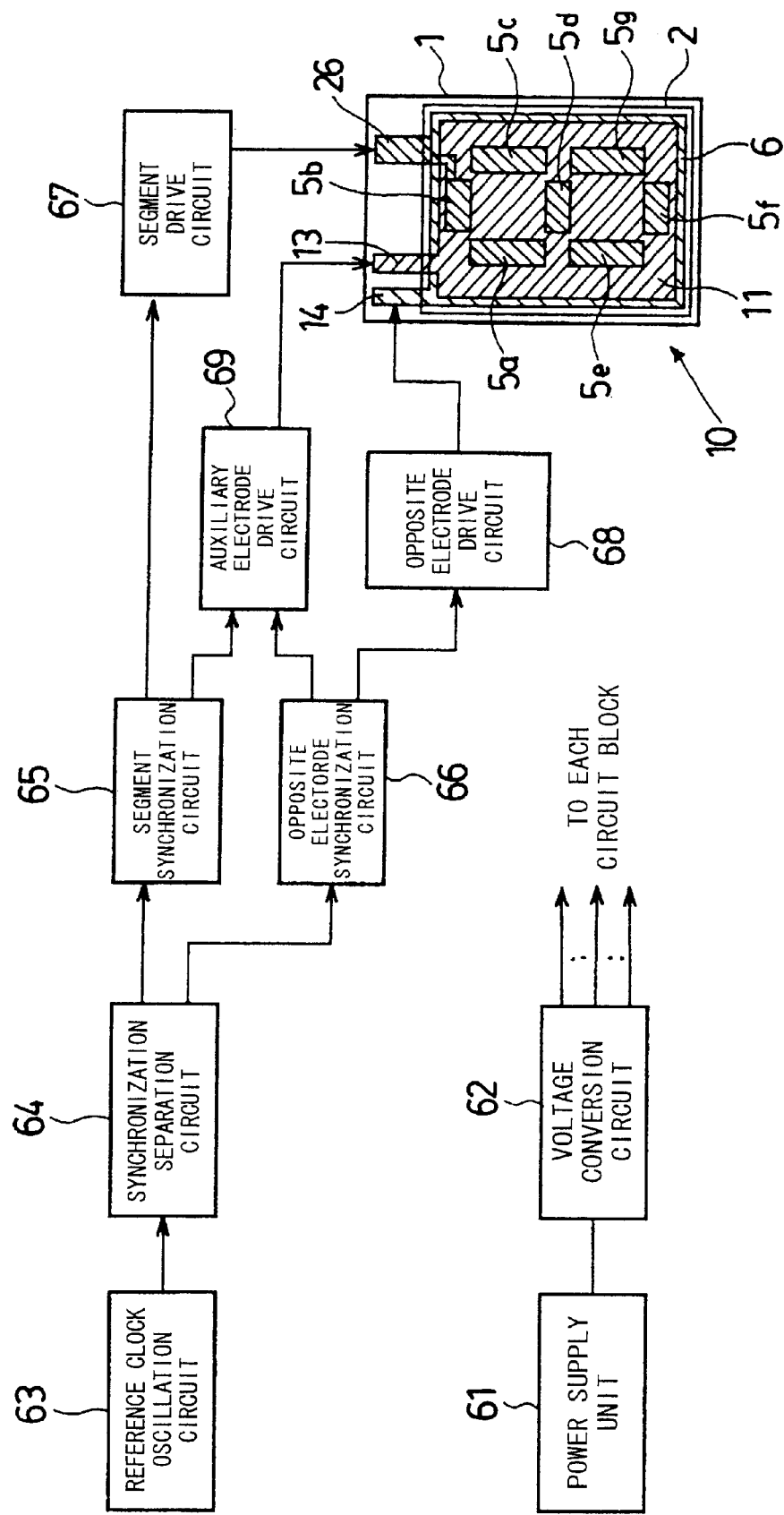
FIG. 6 is a block diagram of circuits relating to display control of the liquid crystal display panel in the timepiece of the same.

Next, a circuit configuration relating to display control of the liquid crystal display panel 10 in this watch and operations thereof are explained using FIG. 6.

A power supply circuit 61 forms basic power supply to be used in this watch with the battery 44 shown in FIG. 2 as a power supply. Then, its output voltage is converted into voltage required for each circuit block by a voltage conversion circuit 62 to be supplied to each circuit block described hereinafter.

A reference clock from a reference clock oscillation circuit 63 is divided by a synchronization separation circuit 64 into clocks for a segment system and an opposite electrode system to be supplied to a segment synchronization circuit 65 and an opposite electrode synchronization circuit 66. As the reference clock oscillation circuit 63, one method is using an oscillator for generating a clock for keeping time, and another method is providing the reference clock oscillation circuit 63 other than that.

Output signals of the segment synchronization circuit 65 are supplied to a segment drive circuit 67 for generating a signal for driving the segment electrodes of the liquid crystal display panel 10 and to an auxiliary electrode drive circuit 69 for generating a signal for driving the auxiliary electrode.

Further, output signals of the opposite electrode synchronization circuit 66 are supplied to an opposite electrode drive circuit 68 for generating a signal for driving the opposite electrode and to the auxiliary electrode drive circuit 69 for generating a signal for driving the auxiliary electrode.

Output voltages of the segment drive circuit 67 are individually applied to the segment electrodes 5a to 5g from the segment electrode terminal 26 (only one is illustrated in the drawing, but each of the segment electrodes 5a to 5g is provided with it) on the upper substrate 1 of the liquid crystal display panel 10. It should be noted that a display signal not shown is also inputted into the segment drive circuit 67 to choose the segment electrode 5 to which voltage is applied in accordance with display contents.

Furthermore, output voltage of the opposite electrode drive circuit 68 is applied from an opposite electrode terminal 14 on the upper substrate 1 through the conductive beads not shown to the opposite electrode 6 on the lower substrate 2. Moreover, output voltage of the auxiliary electrode drive circuit 69 is applied from an auxiliary electrode terminal 13 on the upper substrate 1 to the auxiliary electrode 11.

The synchronization separation circuit 64 is provided with a circuit for reversing application voltages to the segment electrode 5, the auxiliary electrode 11 and the opposite electrode 6, making it possible to choose between the background area in the transmission state and the background area in the scattering state by the magnitude of the voltages to the auxiliary electrode 11 and the opposite electrode 6.

Similarly, it is possible to choose between the transmission state and the scattering state of the display of the pixel area (display area) in synchronization with the background area.

With the configuration as described above, it becomes possible, also in a cellular phone using the segment-type liquid crystal display panel 10, to perform various types of displays by controlling the background area at the display areas 53 to 55 shown in FIG. 1 and controlling the pixel areas synchronizing with the background area.

Specifically, in this watch, it is possible to allow the display hidden behind the liquid crystal display panel 10 not to be viewed or to be viewed by changing between the scattering state and the transmission state of the background area where the auxiliary electrode 11 and the opposite electrode 6 overlap each other.

In addition, a photovoltaic device such as a solar cell is disposed, in place of the reflector 47, under the liquid crystal display panel 10, in which the scattering degree at the background area is controlled by controlling the voltage applied to the auxiliary electrode 11 to thereby control the quantity of light applied to the photovoltaic device, also controlling the quantity of the power generation of the photovoltaic device.

Figure 7:
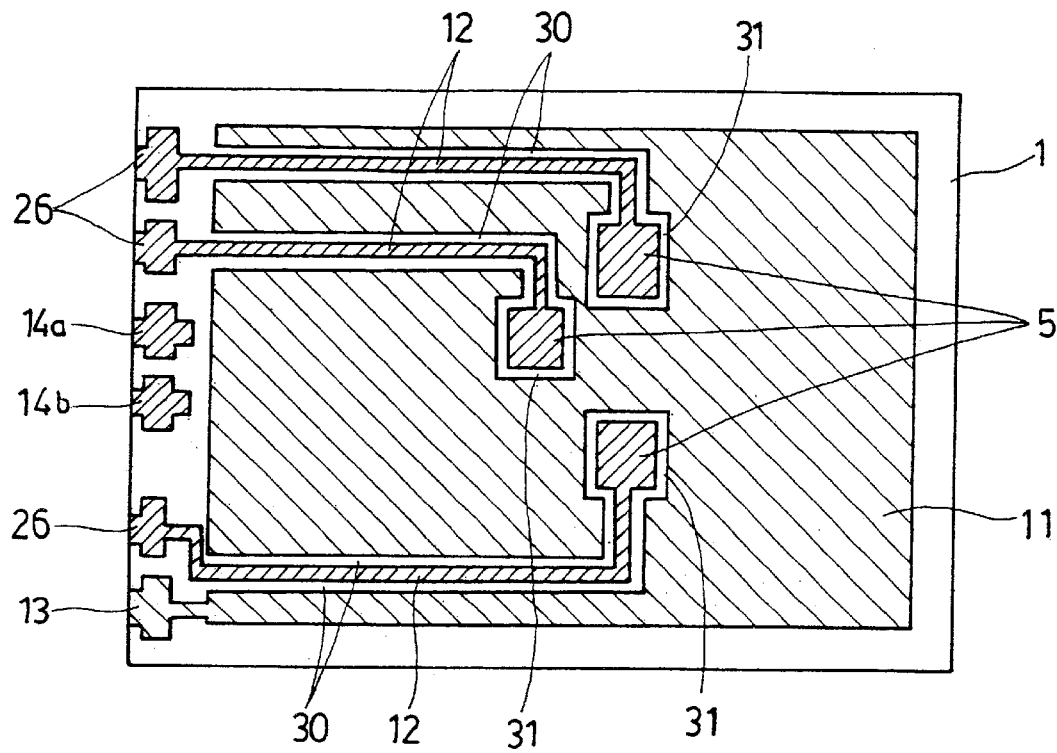
FIG. 7 is a plane view showing a simplified arrangement example of the segment electrodes and the auxiliary electrode which are formed on the upper substrate in a second example of the liquid crystal display panel used in the timepiece according to the present invention.
Figure 8:
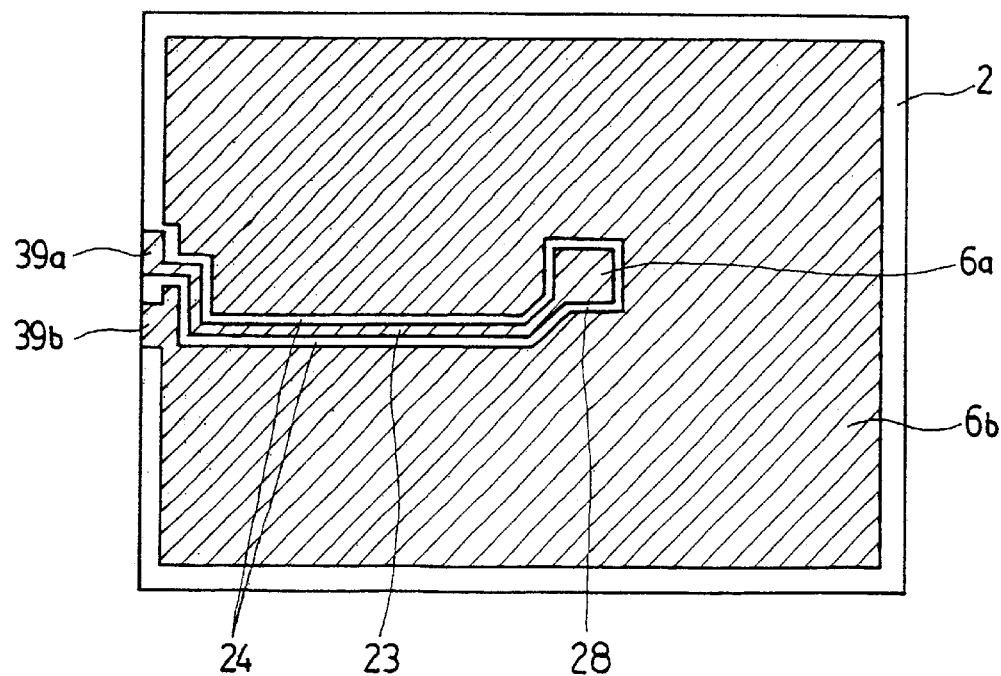
FIG. 8 is a plane view showing an example of a split form of the opposite electrodes formed on a lower substrate of the same.
Figure 9:
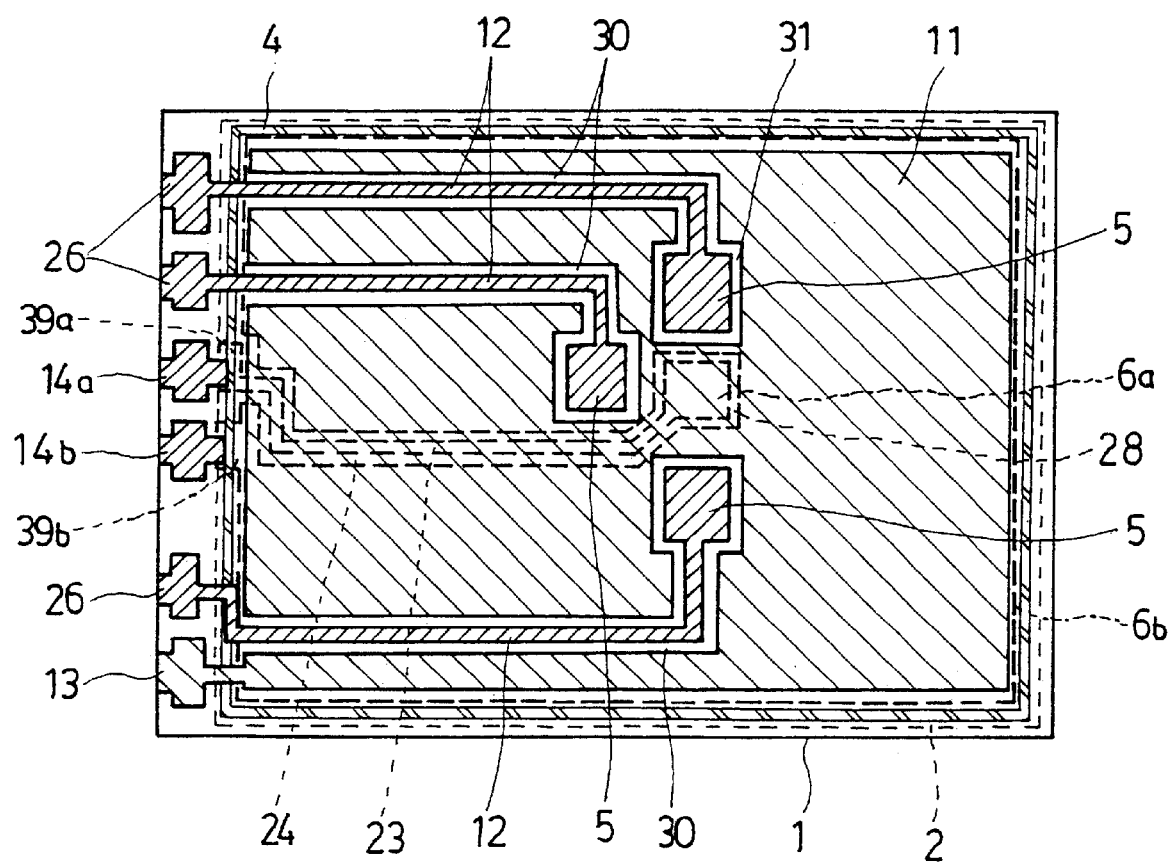
FIG. 9 is a perspective plane view of a state in which the upper substrate and the lower substrate of the same are coupled together as viewed from above the upper substrate.

Second Example of the Liquid Crystal Display Panel: FIGS. 7 to 9

Hereinafter, various types of structural examples of the liquid crystal display panel used in the timepiece according to the invention are explained.

Taking the above-described liquid crystal display panel shown in FIG. 3 to FIG. 5 as a first example, a second example is explained next with FIG. 7 to FIG. 9.

FIG. 7 is a plane view showing a simplified arrangement example of the segment electrodes and the auxiliary electrode which are formed on the inner surface of the transparent upper substrate of the liquid crystal display panel, and FIG. 8 is a plane view showing an example of a split form of the opposite electrodes formed on the lower substrate. FIG. 9 is a perspective plane view of a state in which the upper substrate and the lower substrate are coupled together as viewed from above the upper substrate.

In these drawings, portions corresponding to those of the liquid crystal display panel shown in FIG. 3 to FIG. 5 are assigned the same numerals and symbols.

On the inner surface of the upper substrate (first substrate) 1 of the liquid crystal display panel, as shown in FIG. 7, a plurality of segment electrodes 5 made of an ITO film and thin wiring electrodes 12 integrated with the segment electrodes 5 are formed, and the wiring electrodes 12 are individually connected to the respective segment electrode terminals 26 which are provided in the vicinity of one side of the upper substrate 1.

Around the segment electrodes 5 and the wiring electrodes 12, the auxiliary electrode 11 made of the same ITO film is formed over the entire effective display region with segment electrode gaps 31 formed between the auxiliary electrode 11 and the segment electrodes 5 and wiring gaps 30 formed between the auxiliary electrode 11 and the wiring electrodes 12. The auxiliary electrode 11 is connected to the auxiliary electrode terminal 13 which is provided in the vicinity of the one side of the upper substrate 1.

In the vicinity of the one side of the upper substrate 1, two opposite electrode terminals 14a and 14b are further provided.

On the lower substrate (second substrate) 2, as shown in FIG. 8, a first opposite electrode 6a made of an ITO film and a thin opposite electrode wiring electrode 23 integrated therewith are formed at a position where the first opposite electrode 6a does not overlap any segment electrode 5, and the opposite electrode wiring electrode 23 is connected to a first opposite electrode conducting portion 39a which is provided in the vicinity of one side of the lower substrate 2.

Around the first opposite electrode 6a and the opposite electrode wiring electrode 23, a second opposite electrode 6b made of the same ITO film is formed over the entire effective display region with an opposite electrode gap 28 formed between the second opposite electrode 6b and the first opposite electrode 6a and an opposite wiring gap 24 formed between the second opposite electrode 6b and the opposite electrode wiring electrode 23 respectively. This second opposite electrode 6b is connected to a second opposite electrode conducting portion 39b which is provided in the vicinity of the one side of the lower substrate 2.

In the second example, as described above, the opposite electrode is split into a plurality of parts (two in this example).

The first and second opposite electrode conducting portions 39a and 39b on the second substrate 2 are provided at positions facing the opposite electrode terminals 14a and 14b on the upper substrate 1.

Then, the upper substrate 1 and the lower substrate 2 are coupled together, as shown in FIG. 9, with the sealing material 4 with a predetermined gap intervening therebetween with the spacers (not shown), and the same liquid crystal layer composed of the mixed liquid crystal as that of the first example is sealed in the gap. In this event, the first and second opposite electrode conducting portions 39a and 39b on the lower substrate 2 are individually electrically connected to the opposite electrode terminals 14a and 14b on the upper substrate 1 respectively through the conductive beads contained in the sealing material 4.

As can be understood from FIG. 9, the first opposite electrode 6a is located at a position different from the segment electrodes 5 in the plane view, and further the opposite electrode gap 28 and the opposite wiring gap 24 are also located at positions different from the segment electrode gaps 31 and the wiring gaps 30 in the plane view.

According to this example, the display state of the background area by the auxiliary electrode 11 can be made different between at the portion where the auxiliary electrode 11 overlaps the first opposite electrode 6a and the portion where it overlaps the second opposite electrode 6b by the existence or absence of voltages applied thereto or by making voltages applied thereto different to make the scattering state of the liquid crystal layer different.

The other functions are the same as those of the first embodiment, and thus the description thereof is omitted. It should be noted that only three segment electrodes 5 are illustrated simply, but they are actually formed in a seven-segment pattern for indicating a plurality of numerals or in a pattern for indicating symbols and the like.

Third Example of the Liquid Crystal Display Panel: FIGS. 10 to 14

Next, the third example of the liquid crystal display panel used in the timepiece according to the invention is explained with FIG. 10 to FIG. 14.

Figure 10:
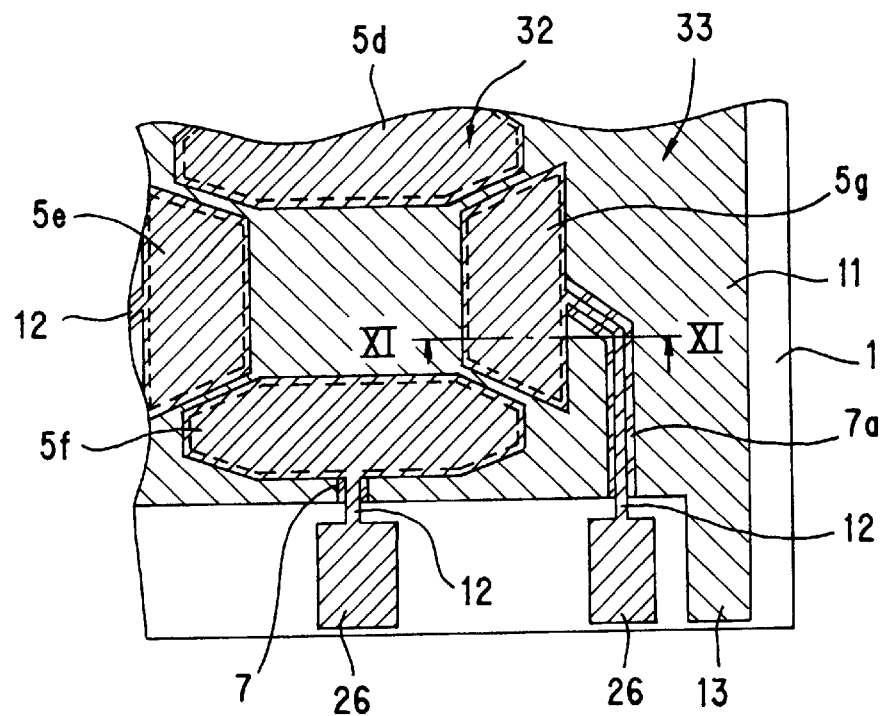
FIG. 10 is a rear view showing a part on the upper substrate side in a third example of the liquid crystal display panel used in the timepiece according to the present invention.
Figure 11:
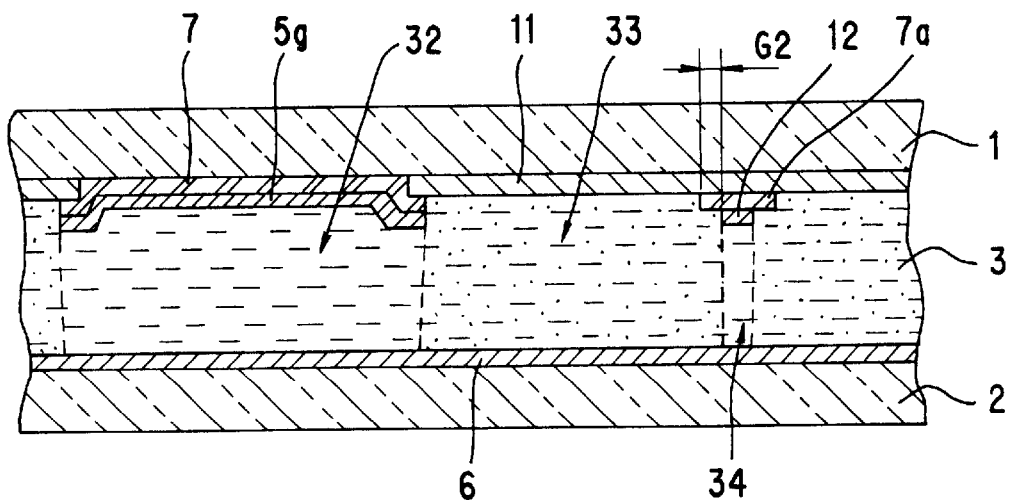
FIG. 11 is a partially enlarged cross-sectional view corresponding to a cross section taken along a line XI—XI in FIG. 10 of the liquid crystal display panel of the same.
Figure 12:
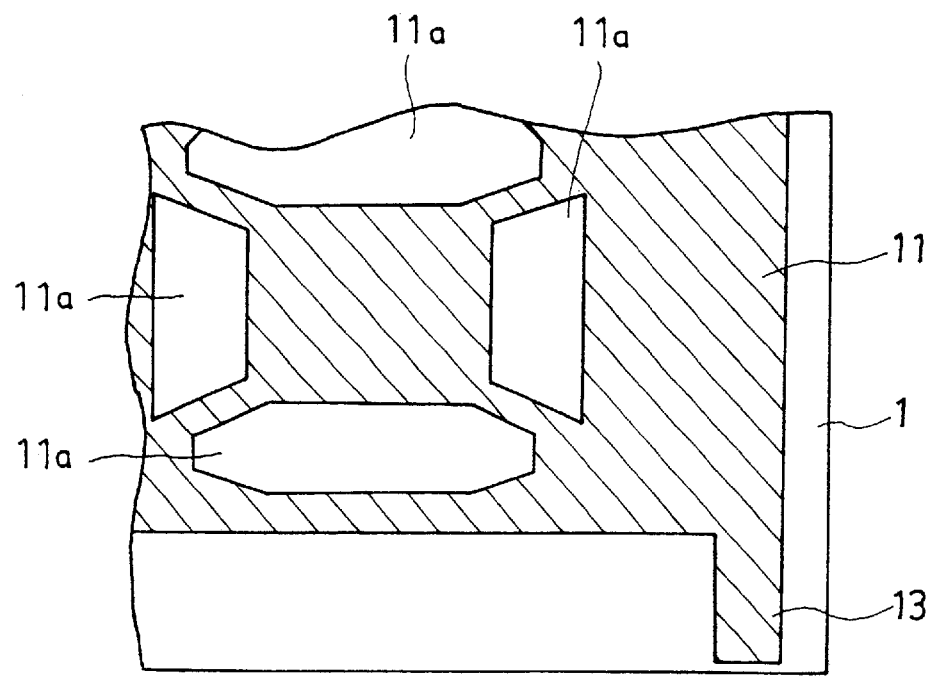
FIG. 12 is a rear view similar to FIG. 10, showing the state in which the auxiliary electrode is formed on the upper substrate of the same.

FIG. 10 is a rear view showing a part on the upper substrate side of the liquid crystal display panel, and FIG. 11 is a partially enlarged cross-sectional view corresponding to a cross section taken along a line XI—XI in FIG. 10 of the liquid crystal display panel. FIG. 12 is a rear view showing the state in which the auxiliary electrode is formed on the upper substrate, FIG. 13 is a rear view showing the state in which an insulating film is further formed on the upper substrate shown in FIG. 12, and FIG. 14 is a plane view showing a part on the lower substrate side of the liquid crystal display panel.

In these drawings, portions corresponding to those of the liquid crystal display panel shown in FIG. 3 to FIG. 5 are assigned the same numerals and symbols, and the description thereof is simplified.

In this liquid crystal display panel, the auxiliary electrode 11 made of an ITO film is first formed, as shown in FIG. 12, on the inner surface of the upper substrate 1 that is the first substrate. In the auxiliary electrode 11, opening portions 11a are formed at positions where insulating films 7 described below and the segment electrodes 5 are to be provided respectively.

Figure 13:
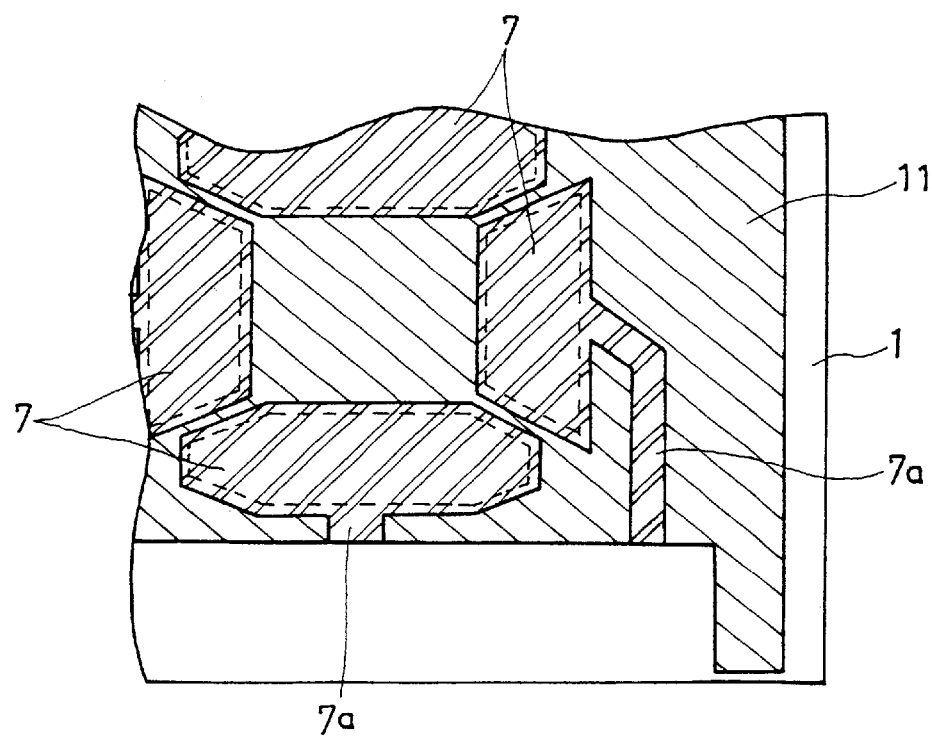
FIG. 13 is a rear view similar to FIG. 12, showing the state in which an insulating film is further formed on the upper substrate shown in FIG. 12.

Then, as shown in FIG. 13, the transparent insulating film 7 made of a photosensitive polyimide resin or the like is formed in each opening portion 11a in the auxiliary electrode 11 on the inner surface of the upper substrate 1 and to partially overlap the auxiliary electrode 11 around the opening portion 11a, and the same insulating film 7a is further formed on the auxiliary electrode 11 within a region where the wiring electrode 12 of each segment electrode 5 is formed.

Then, as shown in FIG. 10, the segment electrodes 5 (in FIG. 10, the segment electrodes 5d to 5g which are a part of the electrodes split in the seven segments in the form of "8" are shown) made of an ITO film are formed on the respective insulating films 7 to be in the same size as the insulating films 7. On each of the insulating films 7a, the wiring electrode 12 which is thinner in width than the insulating film 7a is simultaneously formed at the middle in each width direction, and is formed with the segment electrode terminal 26 directly on the upper substrate 1 at the end portion apart from the insulating film 7a and the auxiliary electrode 11.

Between adjacent electrodes out of the segment electrodes 5d to 5g, a predetermined gap is provided. However, no gap is provided between each of the segment electrodes 5d to 5g and the auxiliary electrode 11, and the peripheral portion of each of the segment electrodes 5d to 5g overlaps the auxiliary electrode 11. However, they are insulated by the insulating films 7, so that voltages can be individually applied to the segment electrodes 5d to 5g.

Meanwhile, on the lower substrate 2 that is the second substrate, as shown in FIG. 14, the opposite electrode 6 made of an ITO film is formed over the entire display region.

Then, the sealing material 4 is applied in the vicinity of the peripheral portion of the lower substrate 2 to couple the upper substrate 1 thereto with the predetermined gap intervening therebetween with the spacers not shown, and the liquid crystal layer 3 made of the same mixed liquid crystal as that of the first example is sealed in the gap as shown in FIG. 11.

Also this liquid crystal display panel has the same function as that of the first embodiment of displaying numerals and the like by optionally controlling the voltages between the segment electrodes 5 and the opposite electrode 6 and the voltage between the auxiliary electrode 11 and the opposite electrode 6 to control the scattering degrees of the liquid crystal layer 3 therebetween, making the background area 33 and the pixel areas 32 different in brightness and darkness, or in color.

Furthermore, since no gap is provided between each of the segment electrodes 5d to 5g and the auxiliary electrode 11 in this liquid crystal display panel, improving visibility of the outline of the pixel area 32 can be improved. Moreover, no wiring gap is provided around the wiring electrode 12 because the auxiliary electrode 11 lies under the wiring electrode 12. Hence, the line width of the wiring electrode 12 is made about 15 µm, thereby reducing visibility of optical change in the wiring area 34 shown in FIG. 11 in either case where voltage is applied between the auxiliary electrode 11 and the opposite electrode 6 or where voltage is applied between the wiring electrode 12 and the opposite electrode. Consequently, a uniform display can be realized when the display region of the liquid crystal display panel is brought into an entire transparent state.

Fourth Example of the Liquid Crystal Display Panel: FIGS. 15 to 20

Next, the fourth example of the liquid crystal display panel used in the timepiece according to the invention is explained with FIG. 15 to FIG. 20.

Figure 15:
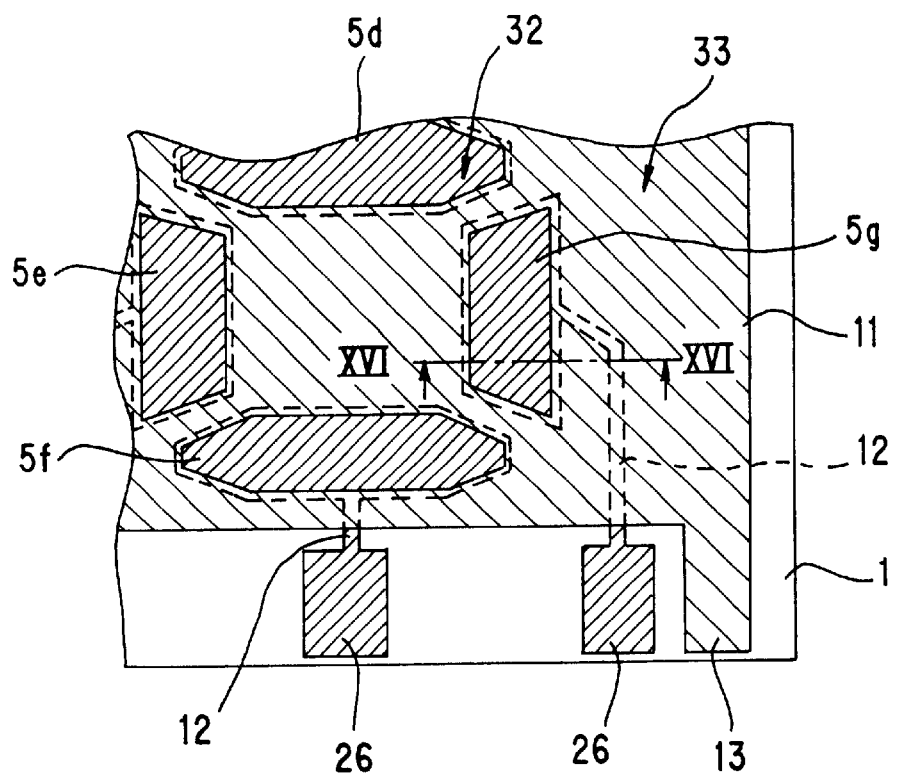
FIG. 15 is a rear view showing a part on the upper substrate side in a fourth example of the liquid crystal display panel used in the timepiece according to the present invention.
Figure 16:
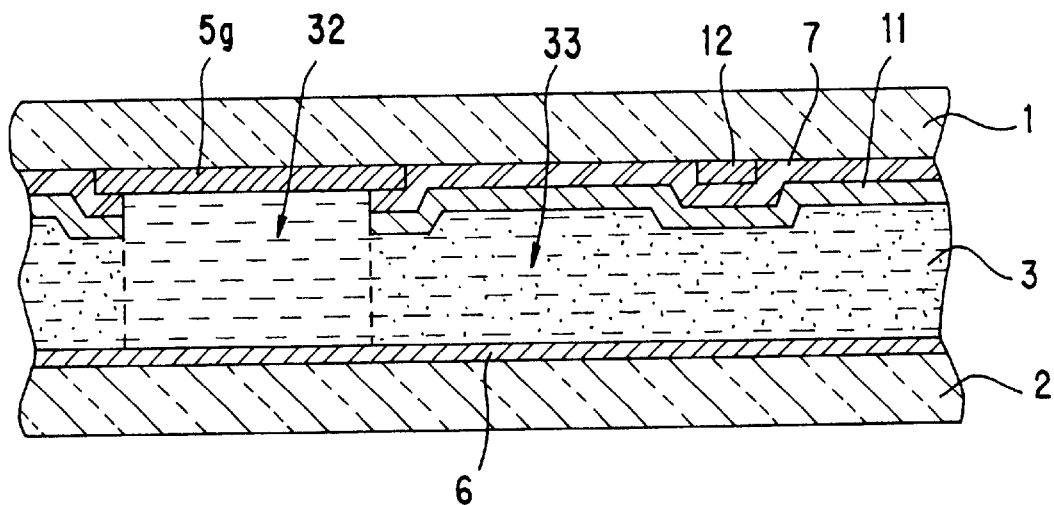
FIG. 16 is a partially enlarged cross-sectional view corresponding to a cross section taken along a line XVI—XVI in FIG. 15 of the liquid crystal display panel of the same.
Figure 19:
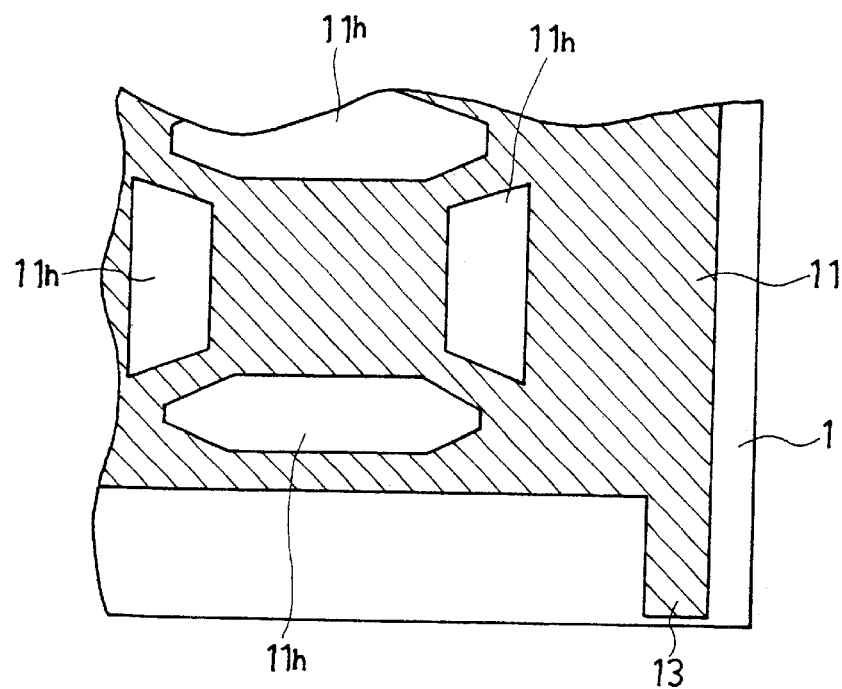
FIG. 19 is a rear view similar to FIG. 17, showing a pattern of only the auxiliary electrode formed on the upper substrate of the same.
Figure 20:
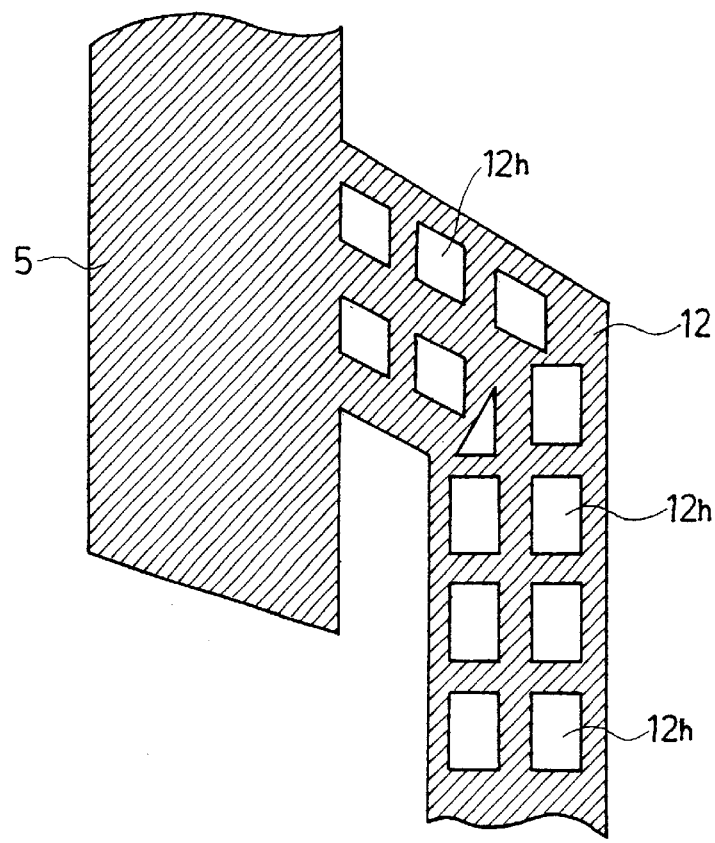
FIG. 20 is a partially enlarged view of the wiring electrode formed integrally with the segment electrode of the same.

FIG. 15 is a rear view showing a part on the upper substrate side of the liquid crystal display panel, and FIG. 16 is a partially enlarged cross-sectional view corresponding to a cross section taken along a line XVI—XVI in FIG. 15 of the liquid crystal display panel. FIG. 17 is a rear view showing a pattern of only the segment electrodes formed on the upper substrate, FIG. 18 is a rear view showing a pattern of only the insulating film formed on the upper substrate of the same, and FIG. 19 is a rear view showing a pattern of only the auxiliary electrode formed on the upper substrate of the same. FIG. 20 is a partially enlarged view of the wiring electrode formed integrally with the segment electrode.

In these drawings, portions corresponding to those of the liquid crystal display panel shown in FIG. 3 to FIG. 5 are assigned the same numerals and symbols, and the description thereof is simplified.

In this liquid crystal display panel, as shown in FIG. 17, a plurality of segment electrodes 5 (in FIG. 17, the segment electrodes 5d to 5g which are a part of the electrodes split in the seven segments in the form of "8" are shown), and the wiring electrodes 12 and the segment electrode terminals 26 for individually applying external signals to the segment electrodes 5d to 5g are first simultaneously formed of an ITO film that is a transparent conductive film on the inner surface of the upper substrate 1 that is the first substrate.

In this event, a number of small holes 12h are formed, as shown in FIG. 20, in the wiring electrode 12 made of the transparent conductive film in order to reduce visibility of the wiring electrode 12, thereby allowing the wiring electrode 12 to be recognized as split in small parts.

On the surface of the upper substrate 1 formed thereon with the segment electrodes 5d to 5g, the transparent insulating film 7 is further formed over the entire display region, which is provided with opening portions 7h each having forms next smaller than the respective segment electrodes 5d to 5g at positions facing the segment electrodes 5d to 5g respectively as shown in FIG. 18.

Moreover, the auxiliary electrode 11 made of an ITO film shown in FIG. 19 is formed on the insulating film 7 on the upper substrate 1. The auxiliary electrode 11 is provided with opening portions 11h which are of the same forms and at the same positions as those of the insulating film 7 and provided with the auxiliary electrode terminal 13.

The insulating film 7 and the auxiliary electrode 11 are made in the same form as described above so that etching processing can be performed for the insulating film 7 with the auxiliary electrode 11 as a mask to pattern it, eliminating necessity of formation of an individual pattern for processing the insulating film 7.

FIG. 15 shows the state in which the segment electrodes 5d to 5g, the wiring electrodes 12, and the segment electrode terminals 26 which are shown in FIG. 17 are formed on the inner surface of the upper substrate 1, the insulating film 7 shown in FIG. 18 is formed on them, and the auxiliary electrode 11 and the auxiliary electrode terminal 13 which are shown in FIG. 19 are further formed.

On the other hand, on the lower substrate 2 that is the second substrate, the opposite electrode 6 made of an ITO film is formed over the entire display region in the same manner as that shown in FIG. 14 on the third example.

Then, the sealing material 4 is applied in the vicinity of the peripheral portion of the lower substrate 2 to couple the upper substrate 1 thereto with the predetermined gap intervening therebetween with the spacers not shown, and the liquid crystal layer 3 made of the same mixed liquid crystal as that of the first example is sealed in the gap as shown in FIG. 16.

Also this liquid crystal display panel has the same function as that of the first example of displaying numerals and the like by optionally controlling the voltages between the segment electrodes 5 and the opposite electrode 6 and the voltage between the auxiliary electrode 11 and the opposite electrode 6 to control the scattering degrees of the liquid crystal layer 3 therebetween, making the background area 33 and the pixel areas 32 different in brightness and darkness, or in color.

Furthermore, also in this liquid crystal display panel, since the auxiliary electrode 11 overlaps the peripheral portion of each of the segment electrodes 5d to 5g with no gap provided between them, visibility of the outline of the pixel area 32 can be improved. Moreover, at the wiring electrode 12, the auxiliary electrode 11 lies above the wiring electrode 12, thereby eliminating influence by the wiring electrode 12 on a display in either case where voltage is applied between the auxiliary electrode 11 and the opposite electrode 6 or where voltage is applied between the wiring electrode 12 and the opposite electrode 6.

Further, the same voltage can be applied to the opposite electrode 6 over the entire display region by the segment electrodes 5d to 5g and the auxiliary electrode 11, which can realize a uniform display when the display region of the liquid crystal display panel is brought into an entire transparent state.

It is possible to use a mixed liquid crystal composed of a liquid crystal aligning transparent solid substance, a liquid crystal and a choral material for twisting the liquid crystal as the liquid crystal layer 3 which is sandwiched between the upper substrate 1 and the lower substrate 2. In this case, the liquid crystal layer 3 exhibits a transmission property where no voltage is applied thereto, and a scattering property where voltage is applied thereto.

In this case, when the segment electrodes 5 and the auxiliary electrode 11 are made at the same potential to provide no potential between they and the opposite electrode 6, no voltage is applied to the liquid crystal layer 3, bringing the display region into an entire transmission state.

By applying a predetermined voltage to the segment electrodes 5, providing potential between they and the opposite electrode 6 and not providing potential between the auxiliary electrode 11 and the opposite electrode 6, the liquid crystal layer 3 at the pixel area 32 shown in FIG. 15 and FIG. 16 are brought into a scattering state, allowing the pixel area 32 in, the scattering state against a transparent background area 33 to be recognized by an observer.

Alternatively, by making the segment electrodes 5 and the auxiliary electrode 11 at the same potential, providing potential between they and the opposite electrode 6 to bring the entire liquid crystal layer 3 into a scattering state, and then selectively controlling the potential between the segment electrodes 5 and the opposite electrode 6, display of the pixel area 32 with high transmittance against the background area 33 in the scattering state can be also performed.

Fifth Example of the Liquid Crystal Display panel:
FIGS. 21 to 25

Next, the fifth example of the liquid crystal display panel used in the timepiece according to the invention is explained with FIG. 21 to FIG. 25.

Figure 21:
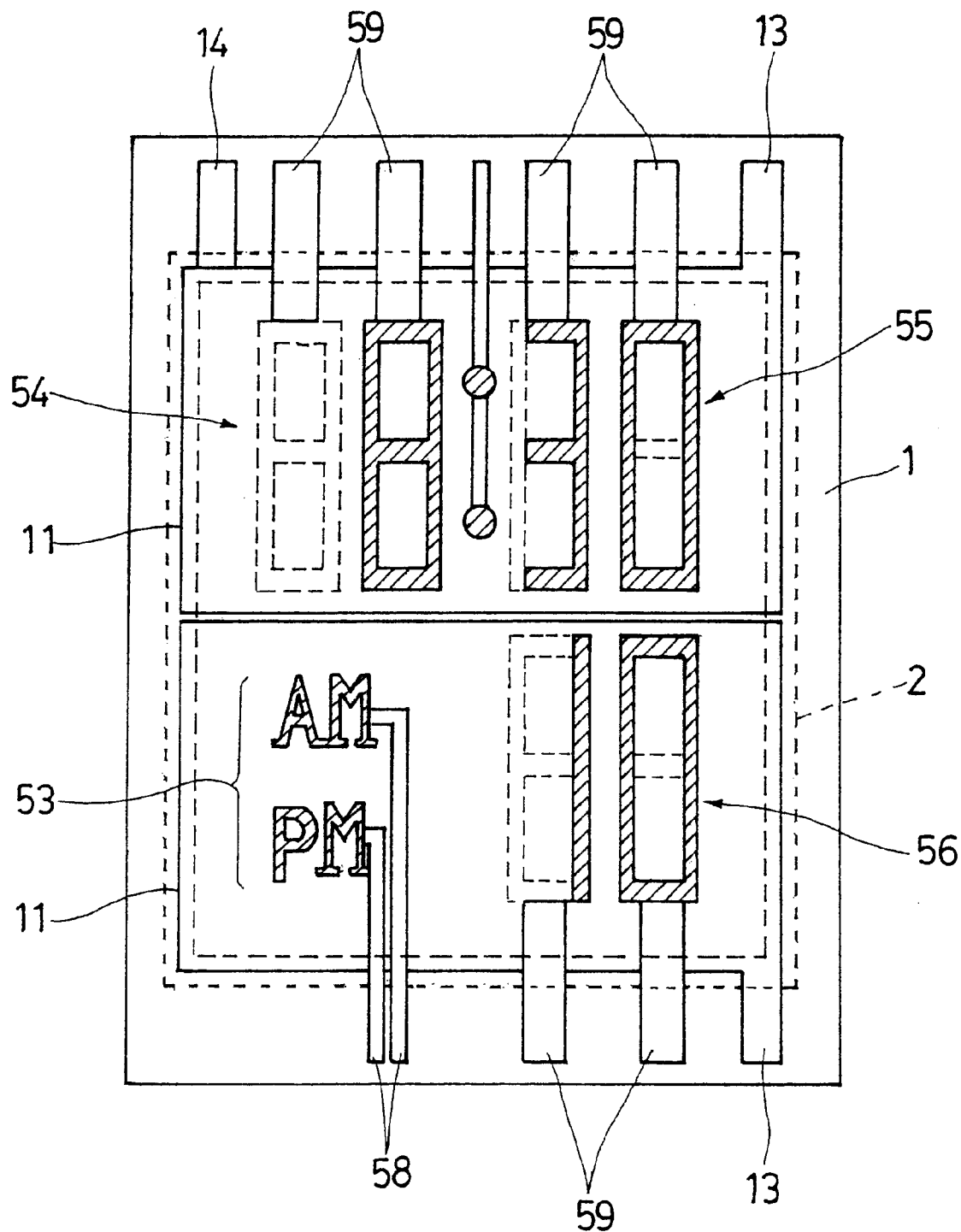
FIG. 21 is a perspective plane view of the entire fifth example of the liquid crystal display panel used in the timepiece according to the present invention as viewed from above the upper substrate.
Figure 22:
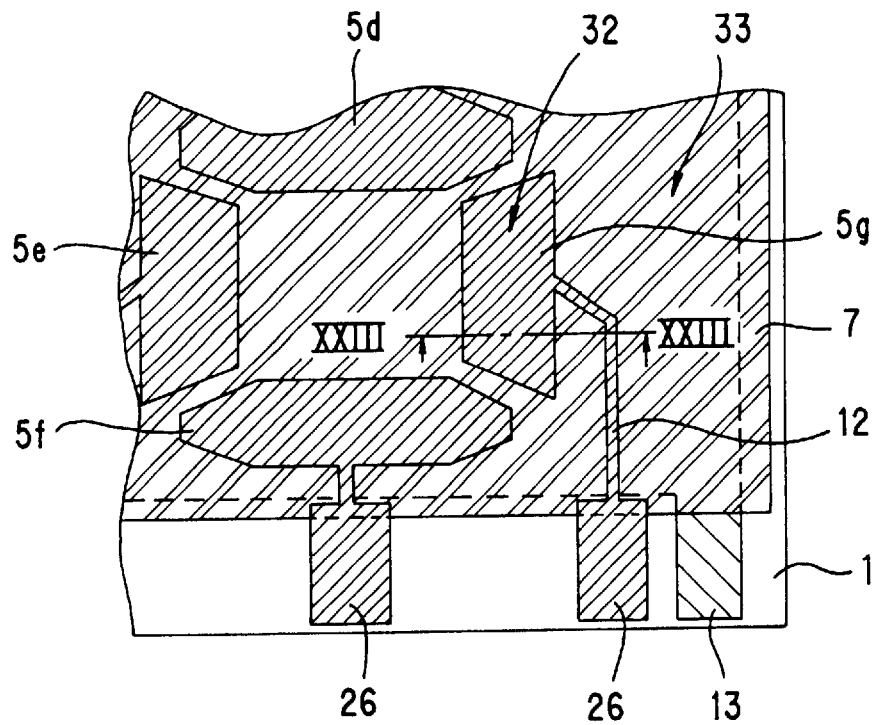
FIG. 22 is an enlarged rear view showing a part on the upper substrate side of the liquid crystal display panel of the same.
Figure 23:
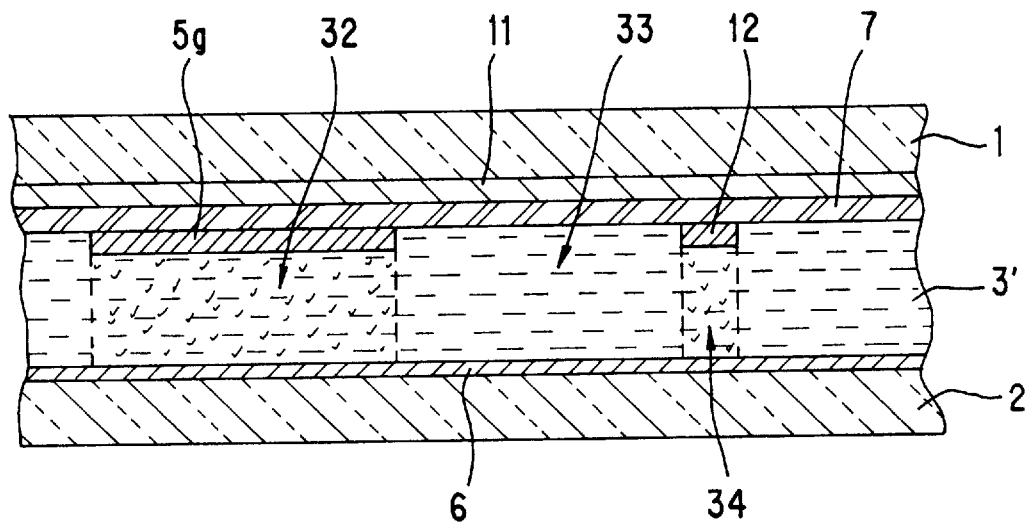
FIG. 23 is a partially enlarged cross-sectional view corresponding to a cross section taken along a line XXIII—XXIII in FIG. 22 of the liquid crystal display panel of the same.
Figure 24:
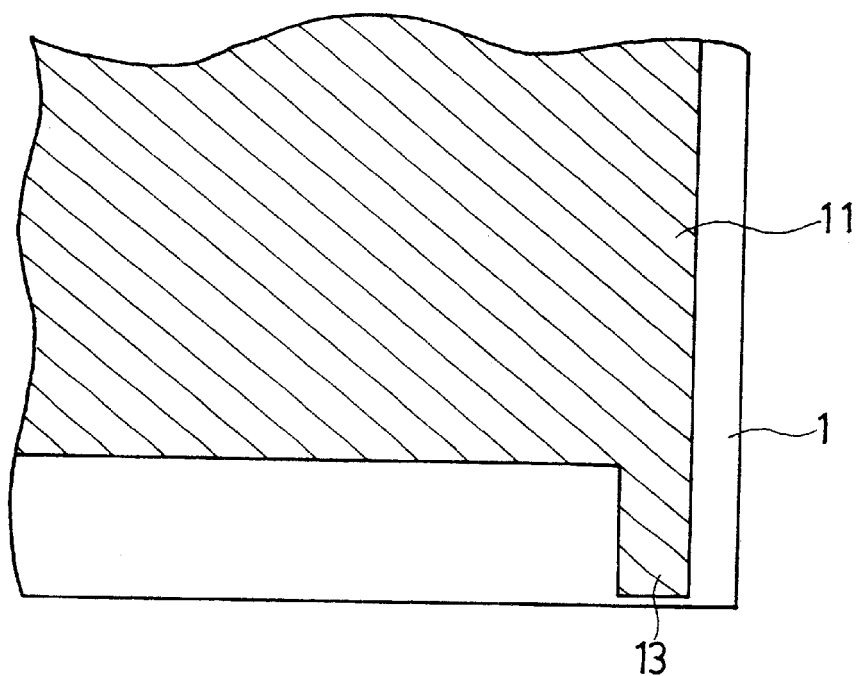
FIG. 24 is a rear view similar to FIG. 22, showing a pattern of only the auxiliary electrode formed on the upper substrate of the same.
Figure 25:
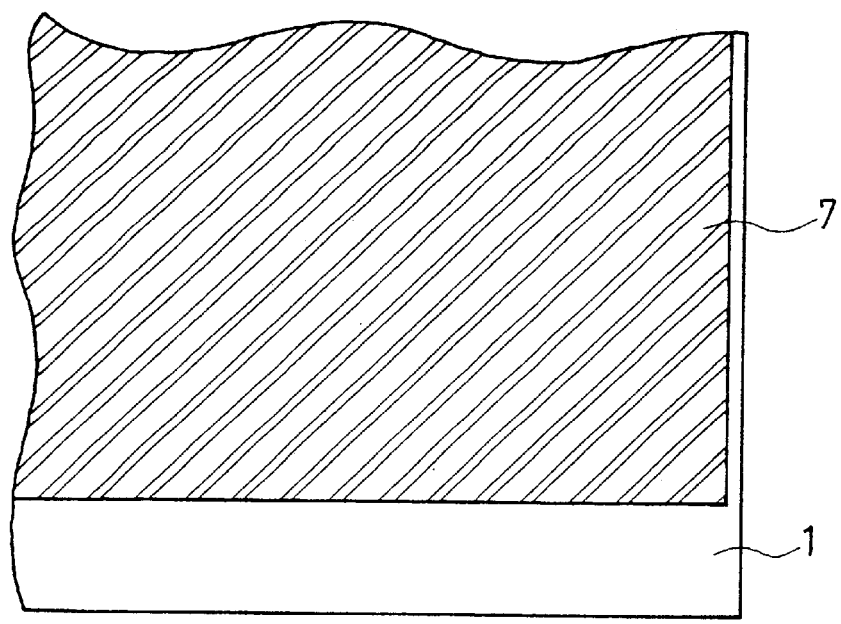
FIG. 25 is a rear view similar to FIG. 24, showing a pattern of only the insulating film formed on the upper substrate of the same.

FIG. 21 is a perspective plane view of the entire liquid crystal display panel as viewed from above the upper substrate, FIG. 22 is an enlarged rear view showing a part on the upper substrate side of the liquid crystal display panel, and FIG. 23 is a partially enlarged cross-sectional view corresponding to a cross section taken along a line XXIII—XXIII in FIG. 22 of the liquid crystal display panel. FIG. 24 is a rear view showing a pattern of only the auxiliary electrode formed on the upper substrate, and FIG. 25 is a rear view showing a pattern of only the insulating film formed on the upper substrate of the same.

Also in these drawings, portions corresponding to those of the liquid crystal display panel explained with FIG. 3 to FIG. 5 are assigned the same numerals and symbols, and the description thereof is simplified.

This liquid crystal display panel has, as shown in FIG. 21, six blocks (three pairs of two digits) composed of groups of segment electrodes in seven segments in the form of "8" (shown simplified in FIG. 21) and the morning/afternoon display area 53 composed of segment electrodes in alphabetical letters of "AM" and "PM" on the inner surface of the transparent upper substrate 1 that is the first substrate.

Further, the hour display area 54 composed of two digit segment electrode blocks and the minute display area 55 which is similarly composed of two digit segment electrode blocks are provided at the upper side in FIG. 21 of the liquid crystal display panel, and the morning/afternoon display area 53 and a second display area 56 composed of two digit segment electrode blocks are provided at the lower side.

At the second display area 56, two segment electrodes not shown may be provided in addition to the seven segment electrodes in order to display days of the week.

Furthermore, segment electrode terminals 59 are provided (though there illustrated is one for each block in FIG. 21, actually seven for each block) which are connected to respective segment electrodes by the wiring electrodes through the sealing material.

Moreover, the auxiliary electrode 11 provided on the inner surface of the upper substrate 1 is split into two in the vertical direction in FIG. 21. Splitting into two in the vertical direction makes it possible to perform, for example, a display of "hour" and "minute" in a desired color against a transparent background, and, conversely, a display of morning/afternoon and a display of second in transparent against a background in a desired color.

The opposite electrode 6 which is provided on the transparent lower substrate 2 that is the second substrate has the opposite electrode terminal 14 outside the sealing material 4 on the upper substrate 1 and is electrically connected to the opposite electrode terminal 14 through the conductive beads contained in the sealing material 4. The auxiliary electrode 11 on the first substrate 1 also has the auxiliary electrode terminal 13 to enable connection to an external circuit.

Details of structures of each electrode and the like in this liquid crystal display panel are explained with FIG. 22 to FIG. 25.

On the inner surface of the upper substrate 1, as shown in FIG. 24, the auxiliary electrode 11 made of an ITO film that is a transparent conductive film is first formed split into two as described above over the entire display region.

Subsequently, the transparent insulating film 7 made of a tantalum pentoxide ($Ta_2O_5$) film is formed to cover the auxiliary electrodes 11 as shown in FIG. 25.

Further, on the insulating film 7, as shown in FIG. 22, the segment electrodes 5 (only 5d to 5g which are a part of the segment electrodes split in seven segments are shown here), the wiring electrodes 12 connected to the respective segment electrodes 5d to 5g, and the segment electrode terminals 26 which are provided in the vicinity of one side of the upper substrate 1 are simultaneously formed of an ITO film that is a transparent conductive film. The width of the wiring electrode 12 is small as compared to that of the segment electrode 5.

It should be noted that the insulating film 7 on the auxiliary electrodes 11 is not pattern formed, but the dielectric constant of the insulating film 7 is increased to decrease voltage consumed by the insulating film 7 and also to make it possible to prevent electrical short circuit between the auxiliary electrodes 11 and the opposite electrode 6 because of conductive dust.

Further, the segment electrodes 5 and the auxiliary electrodes 11 realize a structure in which substantially the entire display region can be covered with electrodes.

On the other hand, on the lower substrate 2, the opposite electrode 6 made of an ITO film is formed over the entire display region in the same manner as that shown in FIG. 14 on the third example.

Subsequently, an alignment film (not shown) made of a polyimide resin is applied onto each inner surface of the upper substrate 1 and the lower substrate 2 and rubbed with a cloth for alignment processing in order to align liquid crystal molecules of a liquid crystal layer 3' in a predetermined direction.

Then, the upper substrate 1 and the lower substrate 2 are coupled together with the sealing material shown in FIG. 14 with a predetermined gap intervening therebetween with the spacers not shown, and the liquid crystal layer 3' composed of a mixed liquid crystal made of a liquid crystal and a dichroic dye is sealed in the gap. The liquid crystal layer 3' twists 180 degrees to 240 degrees and is colored with the dichroic dye when no voltage is applied thereto.

FIG. 23 shows the state in which voltage is not applied between the segment electrode 5g and the opposite electrode 6 but applied between the auxiliary electrode 11 and the opposite electrode 6.

Since voltage is not applied to the liquid crystal layer 3' between the segment electrode 5g and the opposite electrode 6, the pixel area 32 is allowed to be in a colored state. Since voltage is applied to the liquid crystal layer 3' between the auxiliary electrode 11 and the opposite electrode 6, the background area 33 is brought into a transparent state.

Accordingly, it is possible to display colored numerals and the like against a transparent background. In this event, the same voltage as that between the segment electrode 5g and the opposite electrode 6 is also applied to the liquid crystal layer 3' between the wiring electrode 12 and the opposite electrode 6, bringing the wiring area 34 into a colored state, but the wiring electrode 12 has an electrode width of 10 μm to 15 μm so that the optical change in the wiring area 34 is hardly recognized.

Further, since there is no gap provided in the plane between the auxiliary electrode 11 and the segment electrodes 5d to 5g, each pixel area 32 is allowed to perform a sharp display.

Conversely to the above, by applying a predetermined voltage to the segment electrode 5g to provide potential between the segment electrode 5g and the opposite electrode 6, the liquid crystal layer 3' therebetween is brought into a transparent state, and becomes the pixel area 32 in the transmission state against the colored background area 33 when potential is not provided between the auxiliary electrode 11 and the opposite electrode 6.

Consequently, the background area 33 is colored in this event and the pixel area 32 becomes transparent, thus displaying transparent numerals and the like against the colored background.

Furthermore, in this example, the auxiliary electrode 11 is split into a plurality of parts, thereby making it possible to optionally control the background areas 33 into the transparent state or the colored state within the same display region.

Moreover, a photovoltaic device such as a solar cell may be disposed under the liquid crystal display panel to generate at least a part of electric power consumed by a device using the liquid crystal display panel. In this case, it is particularly important to control the transmittance of the background area of the liquid crystal display panel with the segment electrode structure because reducing visibility of the photovoltaic device by the observer tends to be opposed to securing sufficient quantity of light applied to the photovoltaic device, that is, increasing transmittance of the liquid crystal display panel.

Further, employment of the structure in which the auxiliary electrode 11 is split into a plurality of parts enables control of the quantity of power generated by the photovoltaic device and control of display quality according to brightness of environment in which the liquid crystal display panel is used.

Sixth Example of the Liquid Crystal Display Panel: FIG. 26

Next, the sixth example of the liquid crystal display panel used in the timepiece according to the invention is explained with FIG. 26.

FIG. 26 is a cross sectional view similar to FIG. 23, of the liquid crystal display panel, in which portions corresponding to those in FIG. 23 are assigned the same numerals and symbols.

This liquid crystal display panel of the sixth example is substantially the same as the liquid crystal display panel of the above-described fifth example but is different only in that the transparent insulating film 7 made of a tantalum pentoxide ($Ta_2O_5$) film is not provided over the entire auxiliary electrodes but is subjected to etching processing with the segment electrodes 5 (only the segment electrode 5g is shown in FIG. 26) and the wiring electrodes 12 formed thereon as a mask to be patterned.

Hence the insulating films 7 are patterned in the same form as that of the segment electrodes 5 and the wiring electrodes 12. Thereby, the insulating films 7 are easily formed into the same form as that of the segment electrodes 5 and the wiring electrodes 12 without forming an individual etching mask.

The insulating film 7 on the effective region of the auxiliary electrodes 11 is removed as described above, thereby making it possible to apply between the auxiliary electrodes 11 and the opposite electrode 6 substantially the same voltage as that to the segment electrodes 5, which improves uniformity of display. The segment electrodes 5 and the auxiliary electrodes 11 makes a structure in which substantially the entire display region inside the not shown sealing material is covered with electrodes.

Other structures, operations and functions are the same as those of the liquid crystal display panel of the fifth example, and thus the description thereof is omitted.

Seventh Example of the Liquid Crystal Display Panel: FIGS. 27 to 31

Next, the seventh example of the liquid crystal display panel used in the timepiece according to the invention is explained with FIG. 27 to FIG. 31.

Figure 27:
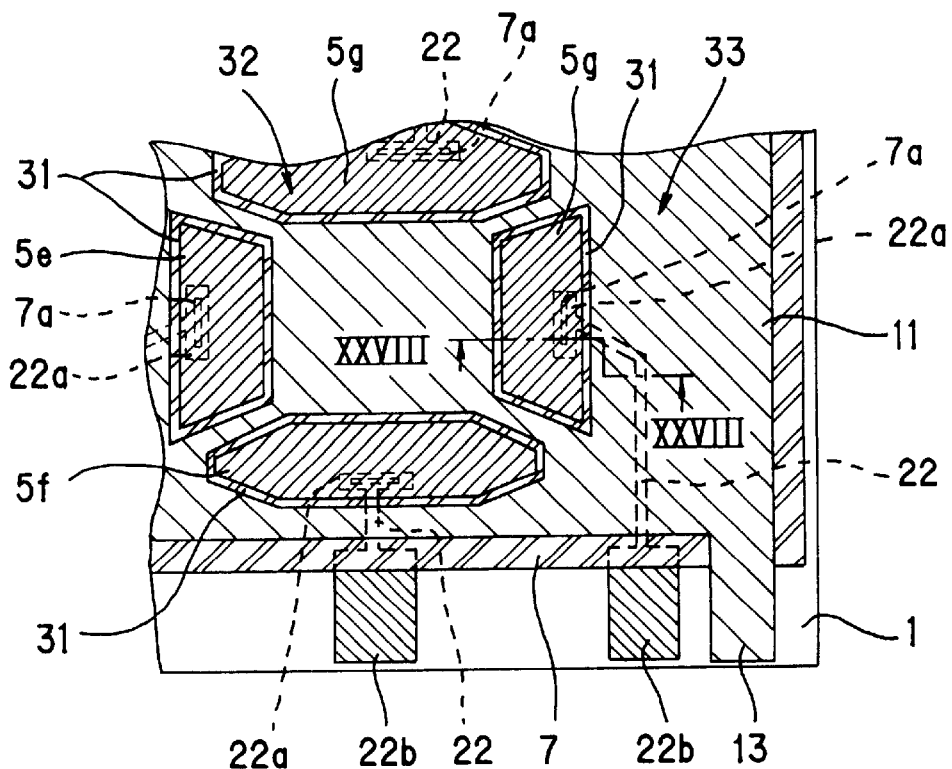
FIG. 27 is an enlarged rear view showing a part on the upper substrate side of a seventh example of the liquid crystal display panel used in the timepiece according to the present invention.
Figure 28:
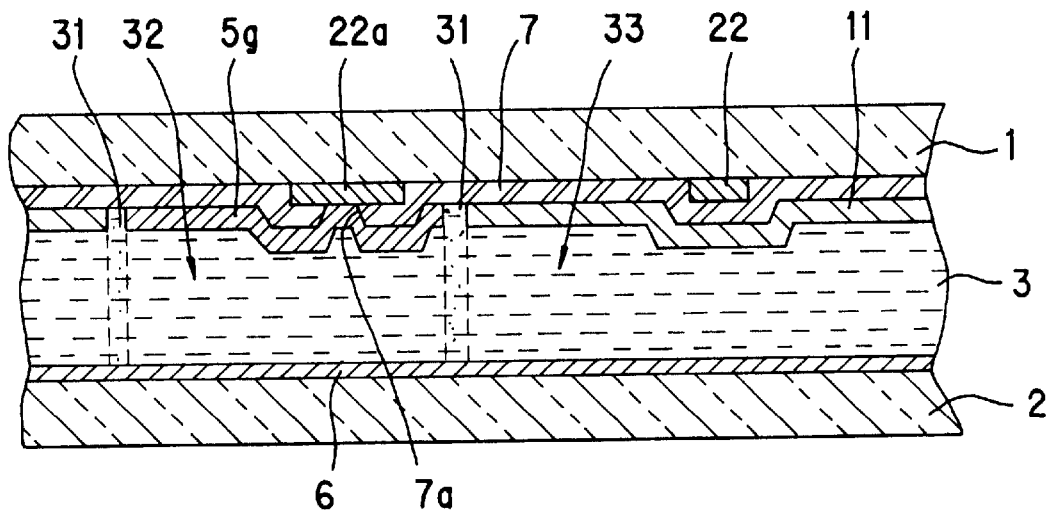
FIG. 28 is a partially enlarged cross-sectional view corresponding to a cross section taken along a line XXVIII—XXVIII in FIG. 27 of the liquid crystal display panel of the same.
Figure 29:
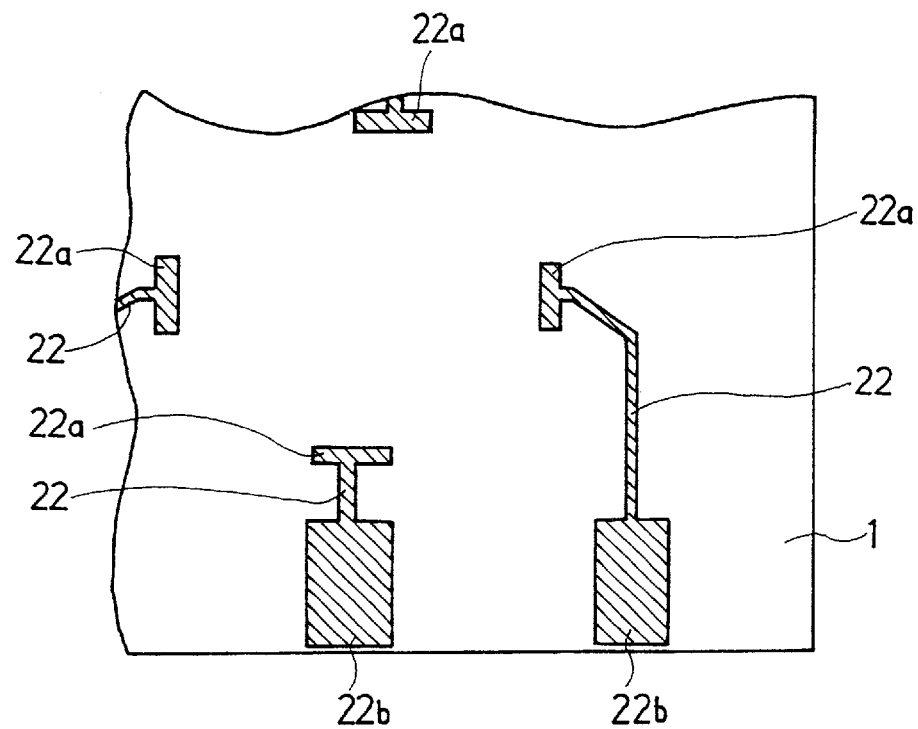
FIG. 29 is a rear view similar to FIG. 27, showing a pattern of only the wiring electrodes formed on the upper substrate of the same.

FIG. 27 is a rear view showing an enlarged part on the upper substrate side of the liquid crystal display panel, and FIG. 28 is a partially enlarged cross-sectional view corresponding to a cross section taken along a line XXVIII—XXVIII in FIG. 27 of the liquid crystal display panel. FIG. 29 is a rear view showing a pattern of only the wiring electrodes fonned on the upper substrate, FIG. 30 is a rear view showing a pattern of only the insulating film formed on the upper substrate of the same, and FIG. 31 is a rear view showing patterns of the segment electrodes and the auxiliary electrode which are formed on the upper substrate of the same.

Also in these drawings, portions corresponding to those of the liquid crystal display panel shown in FIG. 3 to FIG. 5 are assigned the same numerals and symbols, and the description thereof is simplified.

In this liquid crystal display panel, wiring electrodes 22, made of an ITO film that is a transparent conductive film, for respective segment electrodes are first formed, as shown in FIG. 29, on the inner surface (the lower surface in FIG. 28) of the upper substrate 1 that is the first substrate. Each of the wiring electrodes 22 is integrally formed with a connecting pad portion 22a at a position facing the inside of each segment electrode, and a segment electrode terminal portion 22b in the vicinity of one side of the upper substrate 1.

Figure 30:
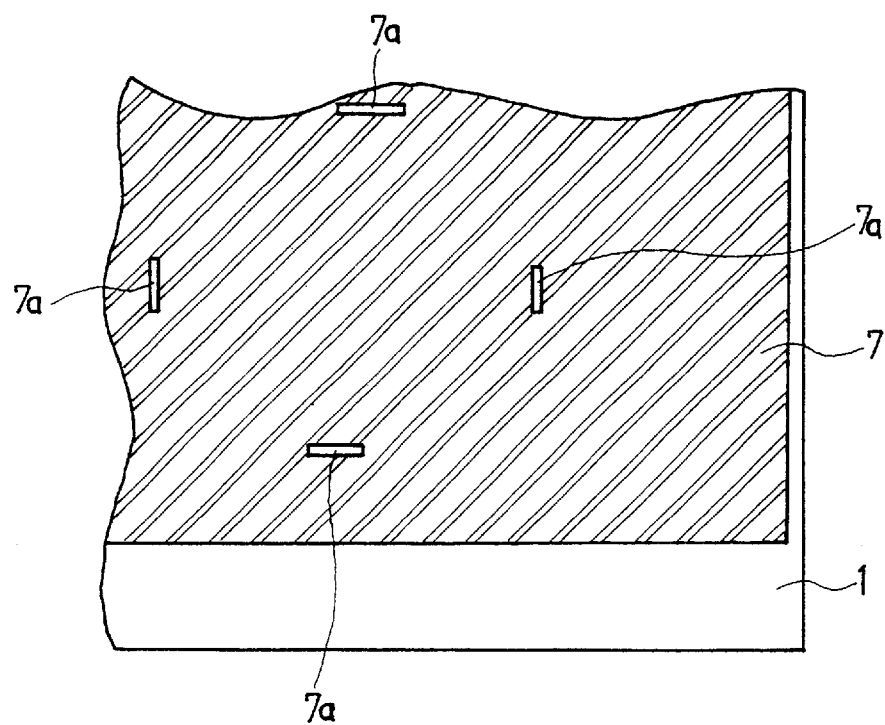
FIG. 30 is a rear view similar to FIG. 29, showing a pattern of only the insulating film formed on the upper substrate of the same.
Figure 31:
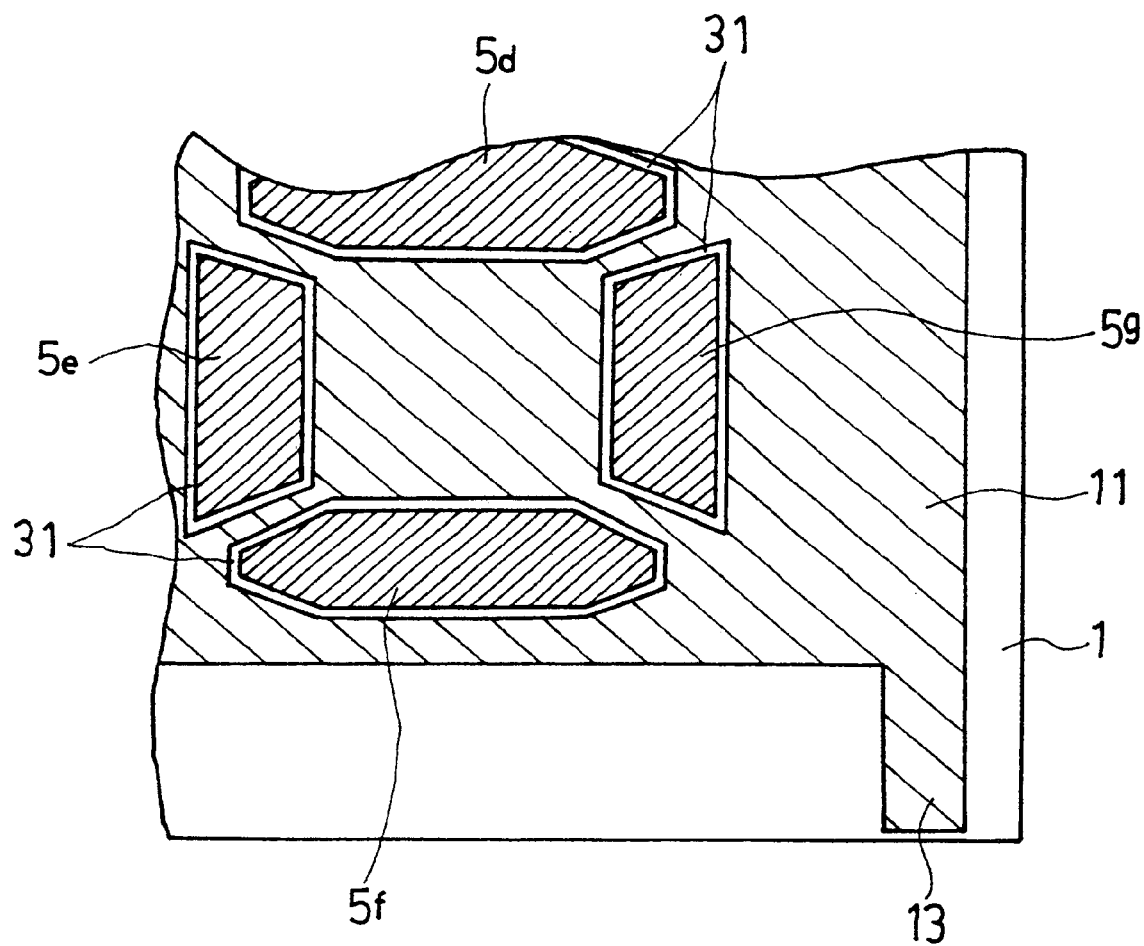
FIG. 31 is a rear view similar to FIG. 29, showing patterns of the segment electrodes and the auxiliary electrode which are formed on the upper substrate of the same.

Thereafter, on the surface of the upper substrate 1 formed thereon with the wiring electrodes 22, the insulating film 7 as shown in FIG. 30 is formed of a transparent photosensitive resin over the entire display region. The insulating film 7 is formed with through holes 7a at positions corresponding to the center of the connecting pad portions 22a of the wiring electrodes 22 respectively.

Further, on the face of the insulating film 7 formed on the upper substrate 1, as shown in FIG. 31, a plurality of segment electrodes 5 (only the segment electrodes 5d to 5g out of the seven segment electrodes are shown in FIG. 31) and the auxiliary electrode 11 therearound are simultaneously formed of an ITO film. Between the segment electrodes 5d to 5g and the auxiliary electrode, the segment gaps 31 are provided respectively.

FIG. 27 shows the state in which the wiring electrodes 22, the insulating film 7, the segment electrodes 5d to 5g, and the auxiliary electrode 11 are formed on the inner surface of the upper substrate 1.

Each of the segment electrodes 5d to 5g is electrically connected to the connecting pad portion 22a of each of the wiring electrodes 22 through the through hole 7a in the insulating film 7. Incidentally, the width of each wiring electrode 22 is small as compared to that of the segment electrodes 5d to 5g.

Further, segment electrodes more than seven segments may be provided as the segment electrodes 5 for each character. Each segment electrode 5 may be formed not linearly but curved to perform a display of rounded numerals and the like.

Each of the segment electrodes 5d to 5g and the auxiliary electrode 11 overlap the wiring electrodes 22 through the insulating film 7 to be electrically isolated. Further, electrostatic capacitance of the insulating film 7 is decreased to thereby make electric energy consumed by the insulating film 7 extremely small.

On the other hand, on the lower substrate 2, the opposite electrode 6 made of an ITO film is formed over the entire display region in the same manner as that shown in FIG. 14 on the third example.

Then, the sealing material is applied near the peripheral portion of the lower substrate 2 to couple the upper substrate 1 thereto with the predetermined gap intervening therebetween with the spacers not shown, and the liquid crystal layer 3 made of the same mixed liquid crystal as that of the first embodiment is sealed in the gap as shown in FIG. 28. The liquid crystal layer 3 composed of the mixed liquid crystal exhibits a scattering property where no voltage is applied thereto, and decreases in scattering degree when applied with voltage to be transparent.

Also this liquid crystal display panel has the same function as that of the first embodiment of displaying numerals and the like by optionally controlling the voltages between the segment electrodes 5 and the opposite electrode 6 and the voltage between the auxiliary electrode 11 and the opposite electrode 6 to control the scattering degrees of the liquid crystal layer 3 therebetween, making the background area 33 and the pixel areas 32 different in brightness and darkness, or in color.

The width of the wiring electrode 22 is made small to reduce visibility to the observer. The segment electrode gap 31 between the segment electrodes 5d to 5g and the auxiliary electrode 11 is made to have a width of about 10 µm to be hardly viewed by applying the same voltage between the segment electrodes 5d to 5g and the opposite electrode 6 and between the auxiliary electrode 11 and the opposite electrode 6.

FIG. 28 shows the state in which the same voltage is applied to the display area 32 constituted of a portion where the segment electrode 5g overlaps the opposite electrode 6 and to the background area 33 constituted of a portion where the auxiliary electrode 11 overlaps the opposite electrode 6. Hence, the display area 32 and the background area 33 exhibit the same transmittance.

Furthermore, by virtue of effects of an oblique electric field from the segment electrode 5g and the auxiliary electrode 11 to the opposite electrode 6, the same transmittance as that of the display area 32 and the background area 33 can be achieved in a portion of the segment electrode gap 31 by applying a large voltage to the liquid crystal layer 3.

This can be realized by making the segment electrode gap 31 small and separating the segment electrode 5g and the auxiliary electrode 11 through the insulating film 7.

Figure 32:
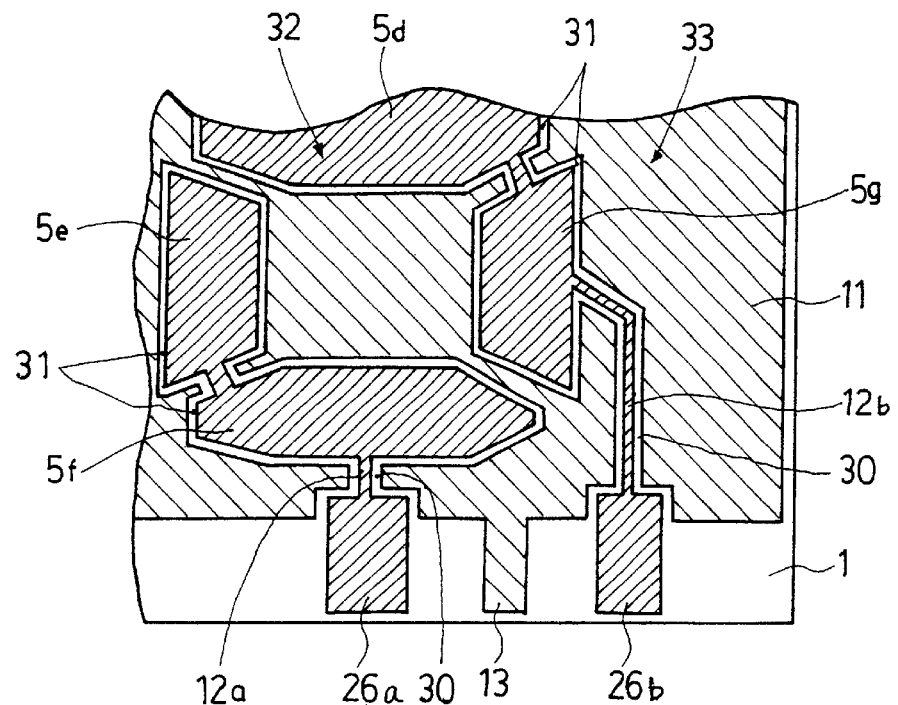
FIG. 32 is an enlarged rear view showing a part on the upper substrate side of an eighth example of the liquid crystal display panel used in the timepiece according to the present invention.
Figure 33:
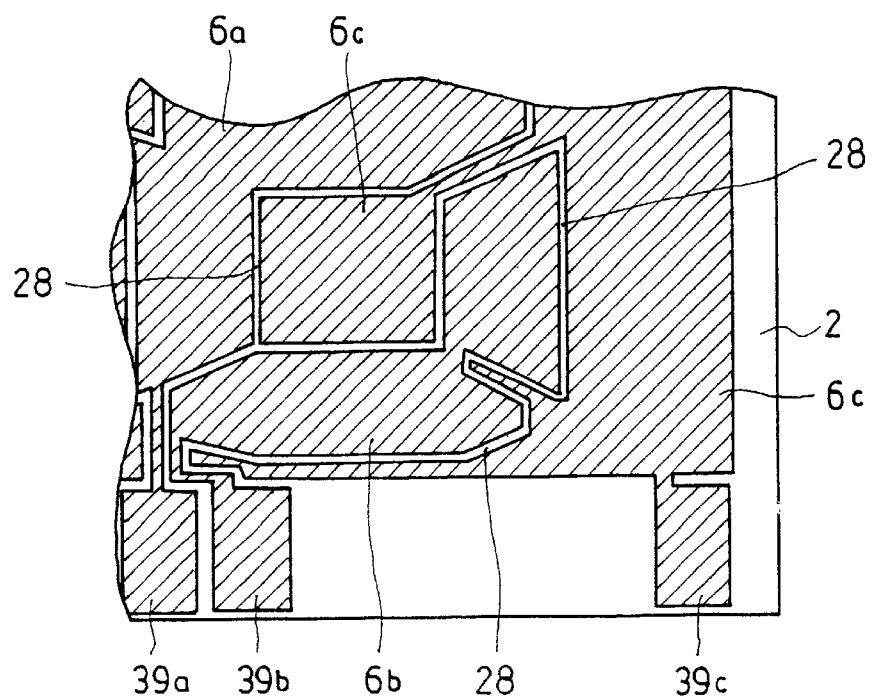
FIG. 33 is a plane view showing a split pattern of the opposite electrodes formed on the lower substrate of the same.

Eighth Example of the Liquid Crystal Display Panel: FIGS. 32 and 33

Next, the eighth example of the liquid crystal display panel used in the timepiece according to the invention is explained with FIG. 32 and FIG. 33.

FIG. 32 is an enlarged rear view showing a part on the upper substrate side of the liquid crystal display panel, and FIG. 33 is a plane view showing a split pattern of the opposite electrodes formed on the lower substrate.

Also in these drawings, portions corresponding to those of the liquid crystal display panel shown in FIG. 3 to FIG. 5 are assigned the same numerals and symbols, and the description thereof is simplified.

In this liquid crystal display panel, a plurality of segment electrodes 5 made of an ITO film, which are provided on the upper substrate 1 that is the first substrate, are mutually connected by two. FIG. 32 shows the segment electrodes 5d to 5g which are a part of the electrodes which are split in seven segments in the form of "8". The segment electrodes 5e and 5f are connected to each other and connected to a segment electrode terminal 26a through a wiring electrode 12a. The segment electrodes 5d and 5g are connected to each other and connected to a segment electrode terminal 26b through a wiring electrode 12b.

Around each of the segment electrodes 5d to 5g and the wiring electrodes 12a and 12b, the auxiliary electrode 11 made of the same ITO film is provided. Further, the segment electrode gaps 31 which are slight gaps are formed between the segment electrodes 5d to 5g and the auxiliary electrode 11, and the wiring gaps 30 which are slight gaps are also formed between the wiring electrodes 12a and 12b, and the auxiliary electrode 11.

The width of the wiring electrodes 12a and 12b is considerably small as compared to the width of the segment electrodes 5d to 5g. Therefore, the segment electrodes 5 and the auxiliary electrode 11 occupy substantially all the area of the display region, and the segment electrode gaps 31, the wiring electrodes 12a and 12b, and wiring gaps 30 exist as a quite small area.

On the other hand, the opposite electrode made of an ITO film which is provided on the lower substrate 2 that is the second substrate is split into a plurality of parts.

In the example shown in FIG. 33, a first opposite electrode 6a is provided at a position mainly facing the segment electrodes 5d and 5e, a second opposite electrode 6b at a position mainly facing the segment electrodes 5f and 5g, and a third opposite electrode 6c at a position facing the auxiliary electrode 11 on the lower substrate 2 with opposite electrode gaps 28 intervening therebetween respectively. The opposite electrode gap 28 is of about 10 µm.

The opposite electrodes 6a, 6b and 6c are respectively connected to opposite electrode conducting portions 39a, 39b and 39c which are provided in the vicinity of one side of the lower substrate 2.

Then, the upper substrate 1 and the lower substrate 2 are coupled together with the segment electrodes 5a to 5g and the opposite electrodes 6a to 6c opposed respectively, and the liquid crystal layer composed of the same mixed liquid crystal as that of the first example or the fifth example is sealed in a gap therebetween.

Also in this liquid crystal display panel, voltage can be selectively applied between each of the segment electrodes 5d to 5g and the first opposite electrode 6a or the second opposite electrode 6b by combination of the mutually connected segment electrodes 5e and 5f and the mutually connected segment electrodes 5d and 5g, and, the first opposite electrode 6a and the second opposite electrode 6b. Further, voltage can be selectively applied also between the auxiliary electrode 11 and the third opposite electrode 6c.

This makes it possible to bring either the liquid crystal layer at the pixel area by the segment electrode which is chosen for a display or the liquid crystal layer at the background area by the auxiliary electrode into a scattering state (or a colored state), and the other into a transparent state, thereby displaying information such as numerals and the like. Moreover, it is also possible to bring the entire display region into a uniform display state by applying the same voltage to the liquid crystal layer at the background area and at the pixel areas or applying no voltage to either.

In this example, segment electrodes are electrically connected to each other by two and the first opposite electrode and the second opposite electrode are provided corresponding to them. The same display function can be obtained with a structure in which three or more segment electrodes are connected, and the same number of opposite electrodes as the number of the connected segment electrodes and an opposite electrode facing the auxiliary electrode are provided.

Another Example of the Liquid Crystal Display Panel

In any of the above-described liquid crystal display panels, it is assumed that the first substrate is the upper substrate 1 and the second substrate is the lower substrate 2, and the observer views a display on the liquid crystal display panel from above the upper substrate 1. Conversely, the observer may view the display on the liquid crystal display panel from the lower substrate 2 side.

In this case, it is unnecessary to form the segment electrodes 5 of a transparent conductive film, and thus they may be formed of a metal film such as aluminum or the like together with the wiring electrodes 12 and the segment electrode terminals 26. The metal plate can be made a reflector. This makes it possible to display numerals and the like by reflected light by the metal plate in a background in a scattering state or a colored state.

Moreover, since the metal film has an electric resistance smaller than that of the ITO film, the wiring electrode 12 can be made thinner to make the wiring area more negligible.

Figure 34:
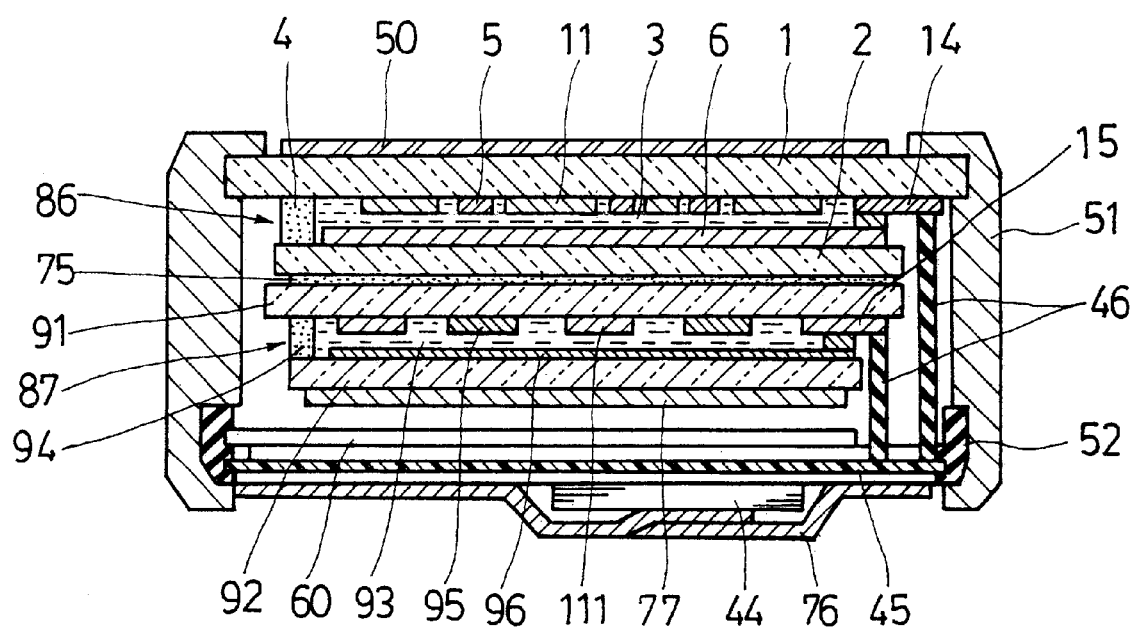
FIG. 34 is a cross sectional view similar to FIG. 5, showing only an internal unit in a second embodiment of the timepiece with a liquid crystal display panel according to the present invention.
Figure 35:
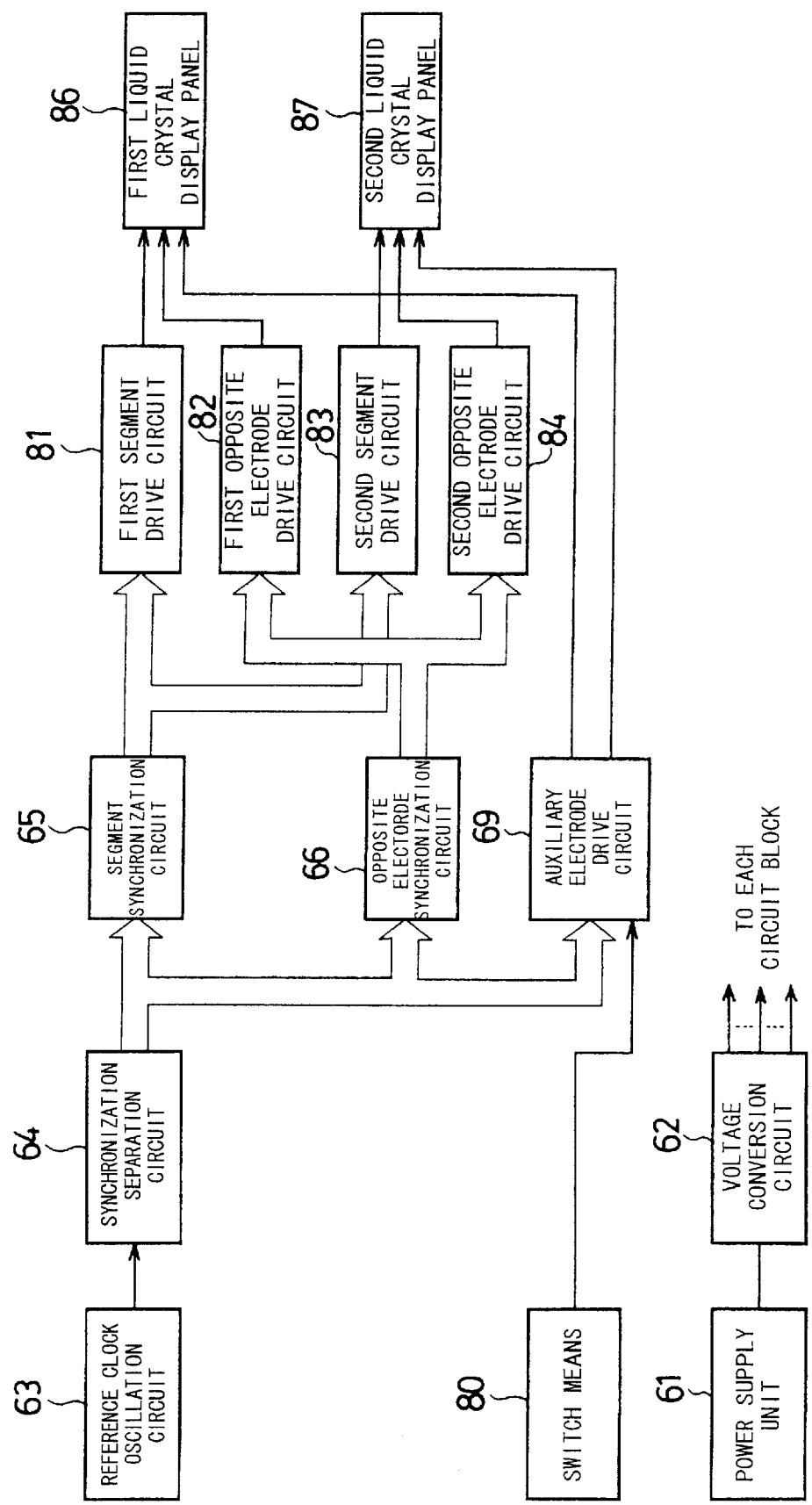
FIG. 35 is a block diagram of circuits relating to display control of the liquid crystal display panel in the timepiece of the same.
Figure 36:
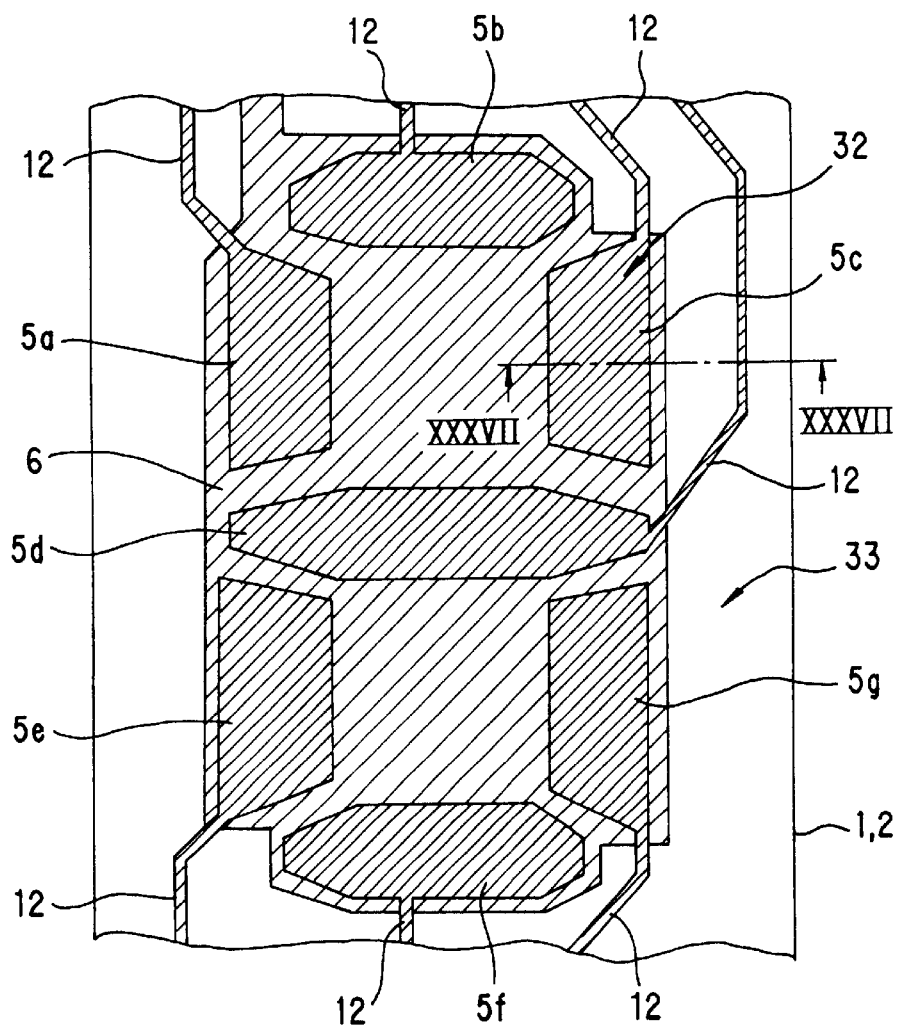
FIG. 36 is a plane view showing an enlarged arrangement example of segment electrodes and an opposite electrode in a conventional segment-type liquid crystal display panel.
Figure 37:
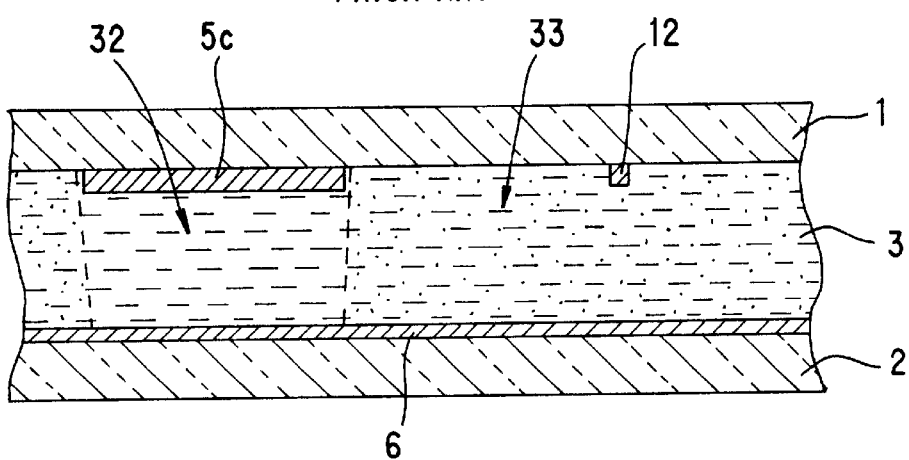
FIG. 37 is a partially enlarged cross-sectional view corresponding toga cross section taken along a line XXXVII—XXXVII in FIG. 36 of the liquid crystal display panel of the same.

Second Embodiment: FIGS. 34 and 35

Next, the second embodiment of the timepiece with the liquid crystal display panel according to the invention is explained using FIG. 34 and FIG. 35.

FIG. 34 is a cross sectional view similar to FIG. 2, showing only an internal unit in the timepiece (electronic watch), and FIG. 35 is a block diagram of circuits relating to display control of the liquid crystal display panel, in which portions corresponding to those shown in FIG. 2 and FIG. 6 are assigned the same numerals and symbols, and the description thereof is simplified.

FIG. 34 shows a schematic cross sectional view of what corresponds to the internal unit which is housed in a sealed space formed by a watchcase 41, a cover glass 42, and a case back 43 in FIG. 2.

This watch is provided with two overlaid segment-type liquid crystal display panels for displaying time information and calendar information.

In a first liquid crystal display panel 86 which is disposed on the cover glass side, an upper substrate 1 and a lower substrate 2 which are transparent glass substrates are coupled together with a sealing material 4, and a liquid crystal layer 3 is sealed in a gap therebetween similarly to the liquid crystal display panel 10 in FIG. 2 of the above-described first embodiment.

Further, on the inner surface of the upper substrate 1, a plurality of segment electrodes 5 and an auxiliary electrode 11 around each segment electrode 5, with a slight gap provided therebetween, are formed of the same ITO film that is a transparent conductive film. Almost all the display region on the upper substrate 1 is covered with the segment electrodes 5 and the auxiliary electrode 11. Furthermore, on the inner surface of the lower substrate 2, an opposite electrode 6 which is similarly made of an ITO film is formed on substantially the entire surface.

The same mixed liquid crystal containing a liquid crystal and a transparent solid substance as the liquid crystal layer of the liquid crystal display panel 10 used in the first embodiment is used as the liquid crystal layer 3 which is sandwiched between the upper substrate 1 and the second substrate 2. For example, the mixed liquid crystal of PNM-157 (trade name) manufactured by Dainippon Ink and Chemicals, Inc. is sealed between the upper substrate 1 and the lower substrate 2, and then applied with ultraviolet light with a wavelength of 360 nm or longer for 60 seconds at a strength of 45 mW/cm$^2$ to form the liquid crystal layer 3. The liquid crystal layer 3 exhibits a scattering property where no voltage is applied thereto.

A second liquid crystal display panel 87 which is disposed under the first liquid crystal display panel 86 is substantially similarly structured, in which an upper substrate 91 and a lower substrate 92 are coupled together with a sealing material 94, and a liquid crystal layer 93 is sealed in a gap therebetween.

On the inner surface of the upper substrate 91, a plurality of segment electrodes 95 and an auxiliary electrode 111 around each segment electrode 95, with a slight gap provided therebetween, are formed of the same ITO film that is a transparent conductive film. Almost all the display region on the upper substrate 91 is covered with the segment electrodes 95 and the auxiliary electrode 111. Furthermore, on the inner surface of the lower substrate 92, an opposite electrode 96 which is similarly made of an ITO film is formed on substantially the entire surface.

A mixed liquid crystal containing a dichroic dye in a liquid crystal of a white-tailor-type guest-host display mode for displaying a transparent state where no voltage is applied thereto is used as the liquid crystal layer 93 which is sandwiched between the upper substrate 91 and the lower substrate 92.

Between the first liquid crystal display panel 86 and the second liquid crystal display panel 87, an adhesive layer 75 having a refractive index at the same level as that of the substrates is provided in order to fix the positions of the panels and increase transmittance. The adhesive layer 75 bonds together the lower substrate 2 of the first liquid crystal display panel 86 and the upper substrate 91 of the second liquid crystal display panel 87.

Furthermore, a transflective reflector 77 is bonded to the lower side of the lower substrate 92 of the second liquid crystal display panel 87, and a circuit board 45 and a battery 44 are further provided.

Electrical connections between the first and second liquid crystal display panels 86 and 87 and the circuit board 45 for driving them are respectively established by two zebra rubber connectors 46 and 46 each made by alternately laminating a conducting material and an insulating material. The upper ends of the zebra rubber connectors 46 and 46 are connected to the respective terminals (not shown) on the upper substrates 1 and 91 and the lower ends thereof are connected to the respective terminals of the circuit board 45.

As for electrical connections to the opposite electrodes 6 and 96 on the lower substrates 2 and 92, connections are established from opposite electrode terminals 14 and 15 on the upper substrates 1 and 91 through conductive beads (not shown) contained in the sealing materials 4 and 94 to the opposite electrode conducting portions on the lower substrates 2 and 92.

Moreover, an auxiliary light source 60 composed of an electro-luminescent (EL) device, which is turned on when an external light that is a main light source is dim, is provided below the second liquid crystal display panel 87.

Furthermore, a panel holder 51 is provided to hold the first and second liquid crystal display panels 86 and 87 and the zebra rubber connectors 46 and 46, and a substrate holder 52 and a battery holder 76 are provided to hold the auxiliary light source 60, the circuit board 45 and the battery 44.

This watch also has an adjusting button for adjusting time, changing display contents, and stopping buzzer in the same manner as the adjusting button 57 shown in FIG. 1 of the first embodiment.

Moreover, on the upper substrate 1 of the first liquid crystal display panel 86, an ultraviolet cut film 50, which has been subjected to anti-reflection treatment, is provided to prevent application of ultraviolet light to the liquid crystal layer 3 and deterioration in color due to application of ultraviolet light to the transflective reflector 77, and to allow external light to be made incident efficiently on the transflective reflector 77.

The internal unit thus structured is housed in a sealed space, which is formed by the watchcase, the cover glass and the case back, similarly to the watch of the first embodiment shown in FIG. 1 and FIG. 2, completing the wristwatch.

Next, a display drive system of the first and second liquid crystal display panels 86 and 87 in the above-described watch is explained using the block diagram in FIG. 35.

Basic power supply for this system is formed by a power supply circuit 61 and is converted into voltage required for each circuit block by a voltage conversion circuit 62 to be supplied to each circuit block.

A reference clock from a reference clock oscillation circuit 63 is divided by a synchronization separation circuit 64 into clocks for a segment system, an opposite electrode system, and an auxiliary electrode system to be supplied to a segment synchronization circuit 65, an opposite electrode synchronization circuit 66, and an auxiliary electrode drive circuit 69.

Output signals of the segment synchronization circuit 65 are sent to a first segment drive circuit 81 for generating a signal for driving the segment electrode 5 of the first liquid crystal display panel 86 and to a second segment drive circuit 83 for generating a signal for driving the segment electrode 95 of the second liquid crystal display panel 87.

Further, output signals of the opposite electrode synchronization circuit 66 are supplied to a first opposite electrode drive circuit 82 for generating a signal for driving the opposite electrode 6 of the first liquid crystal display panel 86 and to the second opposite electrode drive circuit 84 for generating a signal for driving the opposite electrode 96 of the second liquid crystal display panel 87.

Output signals of the auxiliary electrode drive circuit 69 are applied to the auxiliary electrode 11 of the first liquid crystal display panel 86 and to the auxiliary electrode 111 of the second liquid crystal display panel 87.

Output portions of the first segment drive circuit 81, the first opposite electrode drive circuit 82, and the auxiliary electrode drive circuit 69 are connected to the respective electrodes of the first liquid crystal display panel 86.

Similarly, output portions of the second segment drive circuit 83, the second opposite electrode drive circuit 84, and the auxiliary electrode drive circuit 69 are connected to the respective electrodes of the second liquid crystal display panel 87.

The synchronization separation circuit 64 is provided with a circuit configuration for reversing the voltages applied to the segment electrode, the auxiliary electrode and the opposite electrode, making it possible to choose between the background area in the transmission state and the background area in the scattering state in the first liquid crystal display panel 86 by the magnitude of the voltages applied to the auxiliary electrode and the opposite electrode. Similarly, it becomes possible to choose between the transmission state and the scattering state of the display of the pixel area in synchronization with the background area.

Furthermore, it becomes possible to choose between the background area in the transmission state and the background area in the colored state in the second liquid crystal display panel. Similarly, it becomes possible to choose between the transmission state and the colored state of the display of the pixel area in synchronization with the background area.

Moreover, a switch means 80 is connected to the auxiliary electrode drive circuit 69.

Employment of the above-described configuration enables reversal of displays at the pixel area and the background area or an entirely uniform display in the first liquid crystal display panel 86, and transmission and colored displays at the display area and the background area, and a multicolor display utilizing a color of the reflector in the second liquid crystal display panel 87.

Accordingly, the display color can be changed on demand of the observer. Further, changes of display in the display area and the background area can be switched by the switch means 80 which is provided in the watch. It is also possible to provide various types of sensors for automatically making changes depending on an operating environment of the watch.

By the first liquid crystal display panel 86 and the second liquid crystal display panel 87, time information and/or calendar information can be displayed in various display modes.

INDUSTRIAL APPLICABILITY

As described above, a timepiece with a liquid crystal display panel according to the invention makes it possible to optionally reverse brightness and darkness of a pixel area for displaying either time information or calendar information or both, and a background area, to optionally control the quantity of transmission, scattering or absorption of light at the background area, thereby allowing information behind the liquid crystal display panel to be viewed, or, to dispose a photovoltaic device therein and optionally control the quantity of its power generation.

This makes it possible to improve variety of visual design and function of various types of timepieces such as an electronic timepiece in digital display, a combination-type electronic timepiece, and a calendar timepiece, each using a liquid crystal display panel.

What is claimed is:

1. A timepiece with a liquid crystal display panel for displaying either time information or calendar information or both,
   wherein said liquid crystal display panel includes
   a liquid crystal layer sandwiched between transparent first and second substrates, and a plurality of segment electrodes on said first substrate and an opposite electrode on said second substrate respectively to perform a display by a change in a state of transmission, scattering or absorption of light which is made incident on said liquid crystal layer, caused by selectively applying voltage to said liquid crystal layer by means of said segment electrodes and said opposite electrode,
   wherein an auxiliary electrode is provided around said each segment electrode on said first substrate with a slight gap intervening between said segment electrode and said auxiliary electrode, and said auxiliary electrode is formed of same transparent conductive film as that of said segment electrodes, and
   wherein an overlap between said opposite electrode and said segment electrode forms a pixel area, and an overlap between said opposite electrode and said auxiliary electrode forms a background area.

2. A timepiece with a liquid crystal display panel according to claim 1, wherein a plurality of segment electrode terminals for individually applying external signals to said plurality of segment electrodes, and wiring electrodes for connecting said segment electrode terminals and said segment electrodes respectively are provided on said first substrate, and wherein said auxiliary electrode is provided with a slight gap intervening also between said auxiliary electrode and said wiring electrode, said auxiliary electrode, said segment electrodes and said wiring electrodes are formed of same transparent conductive film, and overlaps between said opposite electrode and said wiring electrodes also form said background area.

3. A timepiece with a liquid crystal display panel according to claim 2, wherein the gap between said wiring electrode and said auxiliary electrode on said first substrate is smaller than the gap between said segment electrode and said auxiliary electrode.

4. A timepiece with a liquid crystal display panel according to claim 3, wherein at least a portion of said wiring electrode with a gap formed between said wiring electrode and said auxiliary electrode is a thin wire electrode portion having a width that is same as or smaller than that of the gap.

5. A timepiece with a liquid crystal display panel according to claim 4, wherein said wiring electrode outside an outer periphery of said background area is a thick wire electrode portion having a width larger than that of said thin wire electrode portion.

6. A timepiece with a liquid crystal display panel according to claim 5, wherein a portion of an outer peripheral portion of said auxiliary electrode close to said thin wire electrode portion protrudes to be close to said thick wire electrode portion of said wiring electrode to form a gap between the protruding portion and said thick wire electrode portion, which is smaller than a gap between the protruding portion and said thin wire electrode portion.

7. A timepiece with a liquid crystal display panel according to claim 6, wherein said thick wire electrode portion of said wiring electrode has a connection side portion for connecting said thin wire electrode portion and said segment electrode terminal and an extending portion extending to the opposite side to the portion, and a gap between the protruding portion of said auxiliary electrode and said extending portion is smaller than a gap between the protruding portion of said auxiliary electrode and said connection side portion.

8. A timepiece with a liquid crystal display panel according to claim 1, wherein a plurality of segment electrode terminals for individually applying external signals to said plurality of segment electrodes, and wiring electrodes for connecting said segment electrode terminals and said segment electrodes respectively are provided on said first substrate, and one end portion of each wiring electrode extends to a region where said segment electrode is formed, wherein a transparent insulating film is provided on said first substrate and said each wiring electrode, and said insulating film has an opening portion on said one end portion of each wiring electrode, and wherein said each segment electrode and said auxiliary electrode are provided on said insulating film, and said each segment electrode and said each wiring electrode are connected through the opening portion in said insulating film.

9. A timepiece with a liquid crystal display panel according to claim 1, wherein a photovoltaic device is disposed outside said second substrate of said liquid crystal display panel.

10. A timepiece with a liquid crystal display panel according to claim 2, wherein said wiring electrode has a plurality of holes.

11. A timepiece with a liquid crystal display panel according to claim 2, wherein said segment electrodes and wiring electrodes are formed of a metal film.

12. A timepiece with a liquid crystal display panel according to claim 1, wherein said auxiliary electrode is split into a plurality of parts.

13. A timepiece with a liquid crystal display panel according to claim 1, wherein said opposite electrode is split into a plurality of parts.

14. A timepiece with a liquid crystal display panel according to claim 13, wherein gaps between said split opposite electrodes and gaps between said plurality of segment electrodes are provided at different positions in a plane view.

15. A timepiece with a liquid crystal display panel according to claim 1, wherein two said liquid crystal display panels are tiered to display time information and/or calendar information by said pixel areas and said background areas of said two liquid crystal display panels.

16. A timepiece with a liquid crystal display panel for displaying either time information or calendar information or both, wherein said liquid crystal display panel includes
a liquid crystal layer sandwiched between transparent first and second substrates, and a plurality of segment electrodes on said first substrate and an opposite electrode on said second substrate respectively to perform a display by a change in a state of transmission, scattering or absorption of light which is made incident on said liquid crystal layer, caused by selectively applying voltage to said liquid crystal layer by means of said segment electrodes and said opposite electrode, wherein an auxiliary electrode made of a transparent conductive film is provided between said each segment electrode and around said segment electrodes on said first substrate to overlap peripheral portions of said segment electrodes, and said auxiliary electrode is electrically insulated from said each segment electrode by a transparent insulating film which is provided between said auxiliary electrode and said segment electrode, wherein said segment electrodes are formed directly on said first substrate, said insulating film is formed on said first substrate and at least on peripheral portions of said segment electrodes, and said auxiliary electrode is formed on said insulating film in same planar pattern as the insulating film, and wherein an overlap between said opposite electrode and said segment electrode forms a pixel area, and an overlap between said opposite electrode and said auxiliary electrode forms a background area.

17. A timepiece with a liquid crystal display panel for displaying either time information or calendar information or both, wherein said liquid crystal display panel includes a liquid crystal layer sandwiched between transparent first and second substrates, and a plurality of segment electrodes on said first substrate and an opposite electrode on said second substrate respectively to perform a display by a change in a state of transmission, scattering or absorption of light which is made incident on said liquid crystal layer, caused by selectively applying voltage to said liquid crystal layer by means of said segment electrodes and said opposite electrode, wherein an auxiliary electrode made of a transparent conductive film is provided between said each segment electrode and around said segment electrodes on said first substrate to overlap peripheral portions of said segment electrodes, and said auxiliary electrode is electrically insulated from said each segment electrode by a transparent insulating film which is provided between said auxiliary electrode and said segment electrode, wherein said auxiliary electrode is formed directly on said first substrate, said insulating film is formed on said first substrate within opening portions in said auxiliary electrode and at least on peripheral portions of said opening portions in said auxiliary electrode, and said segment electrodes are formed on said insulating film, and wherein an overlap between said opposite electrode and said segment electrode forms a pixel area, and an overlap between said opposite electrode and said auxiliary electrode forms a background area.

18. A timepiece with a liquid crystal display panel according to claim 17, wherein said segment electrode and said insulating film are in same planar pattern.

19. A timepiece with a liquid crystal display panel for displaying either time information or calendar information or both, wherein said liquid crystal display panel includes
a liquid crystal layer sandwiched between transparent first and second substrates, and a plurality of segment electrodes on said first substrate and an opposite electrode on said second substrate respectively to perform a display by a change in a state of transmission, scattering or absorption of light which is made incident on said liquid crystal layer, caused by selectively applying voltage to said liquid crystal layer by means of said segment electrode and said opposite electrode, wherein an auxiliary electrode made of a transparent conductive film is provided over the entire region forming pixel areas and a background area on said first substrate, a transparent insulating film is provided on said auxiliary electrode, and said each segment electrode is provided on said insulating film, and wherein an overlap between said opposite electrode and said segment electrode forms said pixel area, and an overlap between said opposite electrode and a portion of said auxiliary electrode without said segment electrodes forms said background area.

20. A timepiece with a liquid crystal display panel according to claim 19, wherein said insulating film on said auxiliary electrode is removed at portions where said segment electrodes are not provided.

* * * * *